(12) United States Patent
Matei et al.

(10) Patent No.: US 11,893,327 B2
(45) Date of Patent: Feb. 6, 2024

(54) SYSTEM AND METHOD FOR MACHINE-LEARNING ENABLED MICRO-ASSEMBLY CONTROL WITH THE AID OF A DIGITAL COMPUTER

(71) Applicant: XEROX CORPORATION, Norwalk, CT (US)

(72) Inventors: Ion Matei, Sunnyvale, CA (US); Anne Plochowietz, Palo Alto, CA (US); Saigopal Nelaturi, Mountain View, CA (US); Johan de Kleer, Los Altos, CA (US); Jeng Ping Lu, Fremont, CA (US); Lara S. Crawford, Belmont, CA (US); Eugene M. Chow, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 591 days.

(21) Appl. No.: 17/121,411

(22) Filed: Dec. 14, 2020

(65) Prior Publication Data

US 2022/0188486 A1 Jun. 16, 2022

(51) Int. Cl.
*G06F 30/27* (2020.01)
*G06F 30/17* (2020.01)
(Continued)

(52) U.S. Cl.
CPC ............. *G06F 30/27* (2020.01); *G06F 30/17* (2020.01); *G06N 3/04* (2013.01); *G06F 2111/04* (2020.01)

(58) Field of Classification Search
CPC .......... G06F 30/00; G06F 30/27; G06F 30/17; G06F 2111/04; G06N 3/04; G06N 20/00;
(Continued)

(56) References Cited

U.S. PATENT DOCUMENTS 6,243,696 B1 6/2001 Keeler
7,332,361 B2 2/2008 Lu et al.
(Continued)

FOREIGN PATENT DOCUMENTS

| CN | 101431665 | 5/2009 |
| EP | 1450304 | 8/2004 |
| WO | 2003081527 | 10/2003 |

OTHER PUBLICATIONS

Lee, Jeong Hyun et al., "Mobile Oscillating Bubble Actuated by AC-Electrowetting-on-Dielectric (EWOD) for Microfluidic Mixing Enhancement", May 22, 2012, Sensors and Actuators A 182, Elsevier B.V. (Year: 2012).*

(Continued)

*Primary Examiner* — Cedric Johnson
(74) *Attorney, Agent, or Firm* — Leonid Kisselev

(57) ABSTRACT

System and method that allow utilize machine learning algorithms to move a micro-object to a desired position are described. A sensor such as a high speed camera or capacitive sensing, tracks the locations of the objects. A dynamic potential energy landscape for manipulating objects is generated by controlling each of the electrodes in an array of electrodes. One or more computing devices are used to: estimate an initial position of a micro-object using the sensor; generate a continuous representation of a dynamic model for movement of the micro-object due to electrode potentials generated by at least some of the electrodes and use automatic differentiation and Gauss quadrature rules on the dynamic model to derive optimum potentials to be generated by the electrodes to move the micro-object to the desired position; and map the calculated optimized electrode potentials to the array to activate the electrodes.

20 Claims, 12 Drawing Sheets

(51) Int. Cl.
*G06N 3/04* (2023.01)
*G06F 111/04* (2020.01)

(58) Field of Classification Search
CPC ... B03C 5/005; B81C 99/002; B81C 2203/51; B81C 3/004; G05B 13/042; G05B 13/027; G05B 19/41805; G05B 19/4183; G05B 19/41885
USPC .......................................................... 703/2
See application file for complete search history.

(56) References Cited

U.S. PATENT DOCUMENTS

| | | | |
|---|---|---|---|
| 7,651,598 | B2 | 1/2010 | Shapiro et al. |
| 8,099,265 | B2 | 1/2012 | Houston |
| 8,110,083 | B1 | 2/2012 | Shapiro et al. |
| 9,892,225 | B2 | 2/2018 | Tirapu Azpiroz et al. |
| 9,996,920 | B2 | 6/2018 | Du et al. |
| 10,558,204 | B2 | 2/2020 | Matei |
| 11,242,244 | B2 | 2/2022 | Plochowietz |
| 11,376,591 | B2 | 7/2022 | Lionberger et al. |
| 2002/0108097 | A1 | 8/2002 | Harris et al. |
| 2005/0051429 | A1 | 3/2005 | Shapiro et al. |
| 2005/0125474 | A1 | 6/2005 | Pednault |
| 2005/0149304 | A1 | 7/2005 | Harris et al. |
| 2008/0083621 | A1 | 4/2008 | Sideris |
| 2008/0088551 | A1 | 4/2008 | Cernasov |
| 2010/0329536 | A1 | 12/2010 | Muschler et al. |
| 2015/0076961 | A1 | 3/2015 | Thompson et al. |
| 2016/0171686 | A1 | 6/2016 | Du et al. |
| 2016/0351584 | A1 | 12/2016 | Lu et al. |
| 2016/0356696 | A1 | 12/2016 | Lewis et al. |
| 2016/0370266 | A1* | 12/2016 | White .............. G01N 27/44704 |
| 2017/0102016 | A1 | 4/2017 | Azpiroz et al. |
| 2017/0221032 | A1 | 8/2017 | Mazed |
| 2018/0081347 | A1 | 3/2018 | Matei |
| 2018/0082826 | A1 | 3/2018 | Guha et al. |
| 2019/0240665 | A1* | 8/2019 | Lionberger ............. B03C 5/005 |
| 2020/0207617 | A1 | 7/2020 | Plochowietz |
| 2020/0265296 | A1 | 8/2020 | Olabiyi |
| 2020/0342548 | A1 | 10/2020 | Mazed et al. |
| 2021/0316309 | A1 | 10/2021 | Hung et al. |
| 2021/0356951 | A1 | 11/2021 | Matei et al. |
| 2022/0130158 | A1 | 4/2022 | Kim et al. |
| 2022/0143612 | A1 | 5/2022 | Breinlinger et al. |
| 2022/0147672 | A1 | 5/2022 | Nistala |
| 2022/0152720 | A1 | 5/2022 | Hazui et al. |

OTHER PUBLICATIONS

Matei, Ion et al., "Micro-Scale Chiplets Position Control", Jul. 31, 2019, Journal of Microelectromechanical Systems, vol. 28, No. 4, IEEE. (Year: 2019).*
Matei, Ion et al., "Towards Printing as an Electronics Manufacturing Method: Micro-Scale Chiplet Position Control", May 24-26, 2017, AACC. (Year: 2017).*
Xue et al. "Optimal design of a colloidal self-assembly process," IEEE Transactions on Control Systems Technology, 22(5):1956-1963, Sep. 2014.
Xue et al., "Mdp based optimal control for a colloidal self-assembly system," American Control Conference (ACC), 2013, pp. 3397-3402, Jun. 2013.
Edman et al., Electric field directed assembly of an InGaAs LED onto silicon circuitry. IEEE Photonics Technology Letters, 12(9):1198-1200, Sep. 2000.
Zemánek, Jiří, Tomáš Michálek, and Zdeněk Hurák. "Phase-shift feedback control for dielectrophoretic micromanipulation." Lab on a Chip 18.12 (2018): 1793-1801.
Rupp et al., "Chiplet micro-assembly printer," 2019 IEEE 69th Electronic Components and Technology Conference (ECTC), pp. 1312-1315, May 2019.

Dongbin Xiu, Didier Lucor, C.-H. Su, and George Em Karniadakis. Performance evaluation of generalized polynomial chaos. In Computational Science—ICCS 2003: International Conference, Melbourne, Australia and St. Petersburg, Russia, Jun. 2-4, 2003 Proceedings, Part IV, pp. 346-354, Berlin, Heidelberg, 2003.
Zoran Zivkovic, "Improved adaptive gaussian mixture model for background subtraction," in Pattern Recognition, 2004. ICPR 2004.
Murran, Capacitance-based droplet position estimator for digital microfluidic devices, www.rsc.org/loc (year: 2012).
Armani, Control of miscrofluidic systems: Two examples, results, and challenges, Int. Journal of Robust and Nonlinear Control. (year: 2005).
Murran, Capacitance-based droplet position sensing optimization through digital microfluidic parameters, ASME 2011 (year: 2011).
Yang, Manipulation of droplets in microfluidic systems, Trends in Analytical Chemistry (Year: 2010).
Pollack et al., Electrowetting-based actuation of liquid droplets for microfluidic applications (e.g. Cite as: Appl. Phys. Lett. 77, 1725 ( 2000); https://doi.org/10.1063/1.1308534 Submitted: May 16, 2000 Accepted: Jul. 12, 2000 Published Online: Sep. 5, 2000 (Year: 2000).
Murran et al. (Capacitance-based droplet position estimator for digital microfluidic devices, 2012) (Year: 2012).
Kumar, "Introduction to the Gradient Boosting Algorithm", May 2020, Analytics Vidhya, pp. 1-3 (Year: 2020).
Matei et al., "Micro-scale chiplets position control," Journal of Microelectromechanical Systems, 28(4):643-655, Aug. 2019.
Matei et al., "Towards printing as an electronics manufacturing method: Micro-scale chiplet position control," 2017 American Control Conference (ACC), pp. 1549-1555, May 2017.
Wang et al., "Dielectrophoretic manipulation of cells with spiral electrodes," Biophysical Journal, 72(4):1887-1899, 1999.
Tara D. Edwards and Michael A. Bevan, "Controlling colloidal particles with electric fields." Langmuir, 30(36):10793-10803, 2014. PMID: 24601635 ("Edwards").
Qian et al., "On-demand and location selective particle assembly via electrophoretic deposition for fabricating structures with particle-to-particle precision," Langmuir, 31(12):3563-3568, 2015. PMID: 25314133.
Grzelczak et al., "Directed self-assembly of nanoparticles," ACS Nano, 4(7):3591-3605, 2010. PMID: 20568710.
Paulson et al., "Control of self-assembly in micro- and nano-scale systems," Journal of Process Control, 27:38-49, 2015.
Mastrangeli et al., "Automated real-time control of fluidic self-assembly of microparticles," Robotics and Automation (ICRA), 2014 IEEE International Conference on pp. 5860-5865, May 2014.
Martin Abadi et al. TensorFlow: Large-scale machine learning on heterogeneous systems, 2015.
Tolley et al., "Dynamically programmable fluidic assembly," Applied Physics Letters, 93(25), 2008.
Mathai et al., "Simultaneous positioning and orientation of single nano-wires using flow control," RSC Adv., 3:2677-2682, 2013.
Probst et al., "Flow control of small objects on chip: Manipulating live cells, quantum dots, and nanowires," IEEE Control Systems, 32(2):26-53, Apr. 2012.
Camponogara et al., "Distributed model predictive control," Control Systems, IEEE, 22(1):44-52, Feb. 2002.
Garcia et al., "Model predictive control: Theory and practice—A survey," Automatica, 25(3):335-348, 1989.
Matthew Kelly, "An introduction to trajectory optimization: How to do your own direct collocation," SIAM Review, 59(4):849-904, 2017.
Al-Aradi et al., "Solving nonlinear and high-dimensional partial differential equations via deep learning," 2018.
Nocedal et al., "Numerical Optimization," Springer, New York, NY, USA, second edition, 2006.
A. O'Hagan, "Polynomial Chaos: A Tutorial and Critique from a Statistician's Perspective," University of Sheffield, UK, May 2013.
N. Wiener, "The Homogeneous Chaos," Am. J. Math., vol. 60, No. 4, pp. 897-936, 1938.
D. Xiu, D. Lucor, C.-H. Su, and G. Em Karniadakis, "Performance Evaluation of Generalized Polynomial Chaos," in Computational Science—ICCS 2003: International Conference, Melbourne, Aus-

(56) References Cited

OTHER PUBLICATIONS tralia and St. Petersburg, Russia, Jun. 2-4, 2003 Proceedings, Part IV, Berlin, Heidelberg, pp. 346-354, 2003.
Maclaurin et al., "Autograd: Effortless gradients in numpy," ICML 2015 AutoML Workshop, 2015.
D. P. Kingma and J. Ba, Adam: A Method for Stochastic Optimization. 2014.
Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.
Ralph C. Smith. Uncertainty Quantification: Theory, Implementation, and Applications. Society for Industrial and Applied Mathematics, Philadelphia, PA, USA, 2013.

* cited by examiner

SYSTEM AND METHOD FOR MACHINE-LEARNING ENABLED MICRO-ASSEMBLY CONTROL WITH THE AID OF A DIGITAL COMPUTER

This invention was made with government support under Contract No. HR00111990027 awarded by the Defense Advanced Research Projects Agency. The government has certain rights in the invention.

FIELD

This application relates in general to micro-assembly control, and in particular, to a system and method for machine-learning enabled micro-assembly control with the aid of a digital computer.

BACKGROUND

Micro- and nano-scale particle manipulation has received a lot of research interest. The degree to which control can be exercised over assembly of micro-objects, objects whose dimensions measure in microns, and nano-objects, objects whose dimensions measure in nanometers, can make a significant difference in a number of technologies, including in micro-fabrication, biology and medicine. For example, manufacturing of reconfigurable electrical circuits can be improved by being able to accurately control position of micro-objects such as capacitors and resistors to manufacture a circuit with a desired behavior. Similarly, production of photovoltaic solar cell arrays can benefit from being able to put photovoltaic cells with certain qualities into particular positions on the arrays. Such cells can be too small to allow for a desired placement of the cells via human or robotic manipulation, and another kind of transportation mechanism is needed. Micro-assembly and nano-assembly of particles can also be used to engineer the microstructure of materials, such as of biological cells being assembled into tissue. Many other technological fields exist where increasing control over assembly of micro-and-nano objects can provide significant benefits.

Existing techniques do not allow for control of movement of micro-and-nano-objects with the required degree of precision. For example, uncontrolled mechanical agitation is typically used for directed particle assembly. However, this technique fails to achieve the near 100% yield necessary for certain industrial applications, such as electronics assembly.

Previous work has also attempted to use an electric field to direct movement of micro-objects. For example, in Matei et al., "Micro-scale chiplets position control," *Journal of Microelectromechanical Systems,* 28(4):643-655, August 2019, and Matei et al., "Towards printing as an electronics manufacturing method: Micro-scale chiplet position control," 2017 *American Control Conference (ACC),* pages 1549-1555, May 2017, the disclosures of which are incorporated by reference, a micro-object control policy based on a one-step model predictive control approach is disclosed. The one-dimensional model disclosed is capacitance-based, but the actuation mechanism used was based on spiral-shaped electrode, which limited the number of simultaneously actuated electrodes that can be used by the model. Further, the sizes of the particles whose movement was controlled was assumed to be small enough not to disturb the electric field, which can limit applicability of the described techniques with larger particles.

Likewise, in Wang et al., "Dielectrophoretic manipulation of cells with spiral electrodes," *Biophysical Journal,* 72(4): 1887-1899, 199, describes studying the effect of dielectrophoresis on cancer cells]. This work assumes that the particles involved are spherical and small enough so that the electric field is not disturbed by their presence, limiting the applicability of the described techniques.

A control scheme for individual and ensemble control of colloids is described by Tara D. Edwards and Michael A. Bevan, "Controlling colloidal particles with electric fields." *Langmuir,* 30(36):10793-10803, 2014. PMID: 24601635 ("Edwards"), the disclosure of which is incorporated by reference. In particular, Edwards shows how inhomogeneous electric fields are used to manipulate individual and ensembles of colloidal particles (1 μm to 3 μm diameter) in water and sodium hydroxide solutions through electrophoresis and electroosmosis. The relative size of the colloids to the electrodes employed to generate the field, the medium in which the particles were immersed, and the resulting mathematical models, do not allow the described techniques to be used in certain industrial applications. In particular, the described techniques are not suitable for assembling micro-objects even slightly larger than those discussed in the Edwards paper. Further, the control schemes used involve high frequency signals (MHz), which further limits the applicability of such techniques.

Similarly, Qian et al., "On-demand and location selective particle assembly via electrophoretic deposition for fabricating structures with particle-to-particle precision," *Langmuir,* 31(12):3563-3568,2015. PMID: 25314133, the disclosure of which is incorporated by reference, demonstrated single particle precision and location selective particle deposition, where electrophoretic forces are the primary drive for particle (2 μm polystyrene beads) manipulation. The control scheme employed was based on building large energy wells close to the desired location of the nano-particles. However, the described techniques does not allow for adequate sorting and placement of individual objects. Further, the described techniques do not allow to adequately manipulate asymmetric objects such as semiconductor chips, which require orientation control to be used to build up electronic systems.

Several works, such as Xue et al., "Optimal design of a colloidal self-assembly process," *IEEE Transactions on Control Systems Technology,* 22(5):1956-1963, September 2014, and Xue et al., "Mdp based optimal control for a colloidal self-assembly system," *American Control Conference (ACC),* 2013, pages 3397-3402, June 2013, the disclosures of which are incorporated by reference, describe controlling a stochastic colloidal assembly process that drive the system to the desired high-crystalinity state and that are based on a Markov-Decision Process optimal control policy. The dynamic model is based on actuator-parametrized Langevin equations. However, in these works, individual particles are not directly manipulated and how this approach can be used when assembling electrical circuits is unclear. Moreover, the size of the particles used (≈3 μm in diameter) is small to the extent that they pose little disturbance to the electric field that is completely shaped by an actuation potentials. In addition, the time scale for achieving the desired state would make the goal of high throughput using this approach challenging to achieve.

Other self-assembly control approaches, such as described by Grzelczak et al., "Directed self-assembly of nanoparticles," *ACS Nano,* 4(7):3591-3605, 2010. PMID: 20568710; Paulson et al., "Control of self-assembly in micro- and nano-scale systems," *Journal of Process Control,* 27:38-49, 2015; Mastrangeli et al., "Automated real-time control of fluidic self-assembly of microparticles," *Robotics* and Automation (ICRA), 2014 IEEE International Conference on pages 5860-5865, May 2014; and Paulson et al., "Control of self-assembly in micro- and nano-scale systems," *Journal of Process Control*, 27:38-49, 2015, the disclosures of which are incorporated by reference, do not, as they are, allow to easily scale the number of objects being moved.

Water-based solution in which particles are immersed is a popular choice of control medium, such as described by Edman et al., "Electric field directed assembly of an InGaAs LED onto silicon circuitry. *IEEE Photonics Technology Letters*, 12(9):1198-1200, September 2000 and Tolley et al., "Dynamically programmable fluidic assembly," *Applied Physics Letters*, 93(25), 2008, the disclosures of which are incorporated by reference. In such cases, both electrophoretic forces as well as fluid motions of electro-osmotic flows are used to drive particles. However, water does not behave like a dielectric, hence cannot generate electric fields, resulting in lower forces for moving objects, thus significantly limiting the size of objects that can be moved using this setup.

Accurate control of cells, quantum dots and nano-wires bases on electroosmosis is used in Mathai et al., "Simultaneous positioning and orientation of single nano-wires using flow control," *RSC Adv.*, 3:2677-2682, 2013 and Probst et al., "Flow control of small objects on chip: Manipulating live cells, quantum dots, and nanowires," *IEEE Control Systems*, 32(2):26-53, April 2012, the disclosures of which are incorporated by reference. The authors use linear models of the electrodes potentials, and the particles effect on the electric field distribution is negligible. However, the presented linearity in the electrodes potentials does not hold when driving forces are primarily dielectrophoretic, thus limiting the applicability of these techniques. Further, the presented linearity may not hold with objects on a microscale.

Finally, Zemánek et al., 'Feedback-controlled dielectrophoretic micromanipulation," 2018 *International Conference on Manipulation, Automation and Robotics at Small Scales (MARSS)*, July 2018, the disclosure of which is incorporated by reference, describe a dielectrophoresis-based feedback for micro-sphere manipulation. The authors use a simulated annealing approach for solving the optimal control problem, where they take advantage of a sphere-like shape of the particle when building the system model. However, due to the dependence of this technique on the spherical shape of the particle being moved, limits the applicability of the technique.

Therefore, there is a need for a scalable way to control an assembly of micro-objects of varying shapes that can be implemented in real-time.

SUMMARY

Systems and methods for utilizing machine learning algorithms to move a micro-object to a desired position are described. A sensor such as a high speed camera or array of capacitive sensors tracks the locations of the objects. An array of programmable electrodes can be individually controlled with integrated electronics, such as an active matrix array, or with a video projector projecting light patterns addressing a photo-switch or photo-transistor to control each electrode dynamically, and thus generate a dynamic potential energy landscape for manipulating objects. Dielectrophoretic (DEP) and electrophoretic (EP) forces are example forces which could be generated to move the micro-objects. The micro-object can be semiconductor chip, an integrated circuit, a particle, a nanodevice or structure, or any object which an array of electrodes can physically manipulate. One or more computing devices are used to: process sensing data such as images captured by the camera to estimate an initial position of a micro-object; generate a continuous representation of a dynamic model for movement of the micro-object due to electrode potentials generated by at least some of the electrodes and use automatic differentiation and Gauss quadrature rules on the dynamic model to derive optimum potentials to be generated by the electrodes to move the micro-object to the desired position; and map the calculated new electrode potentials to the electrode array. For the case of electrode array with integrated active matrix addressing electronics, the potential on each electrode of the array is updated electronically. For the case of an electrode array controlled with a video projector illuminating arrays of phototransistors or photo-switches connected to each electrode, the potential on each electrode is updated by updating the image projected on the array using a video projector. The projected images activate or deactivate electrodes, as indicated by the control inputs. The system and method allow for real-time control of micro-object positioning in a manner that is scalable and computationally efficient.

In one embodiment, a system and method for machine-learning enabled micro-assembly control with the aid of a digital computer are provided. The system includes one or more processors implementing one or more machine learning algorithms, the one or more processors configured to: obtain one or more parameters of a system for positioning a micro-object, the system comprising a plurality of electrodes, each of the electrodes are programmable, the electrodes configured to induce a movement of the micro-object when the micro-object is proximate to the electrodes upon a generation of one or more electric potentials by one or more of the electrodes; model capacitance between the micro-object and the electrodes using the parameters; estimate a position of the micro-object with a sensor; receive further position of the micro-object; define using the capacitance as a continuous representation of a dynamic model for movement of the micro-object due to electrode potentials generated by at least some of the electrodes, wherein the dynamic model is associated with constraints expressed as expectations; apply one of the machine learning algorithms to at least a portion of the continuous representation of the dynamic model to perform an optimization of electrode potentials to be generated by at least some of the electrodes to move the micro-object from the estimated position to the further position; use the optimized electrode potentials to actuate at least some of the electrodes to induce the movement of the micro-object from the estimated position to the further position.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The system and method described below provide an efficient, scalable way to find control policies, electrode potential assignments that move a micro-object towards a desired position. The analysis involves transforming a micro-model (the dynamic model with distributed parameters) to a macro-model (the dynamic model with a continuous distribution) and using machine-learning based optimization to find the control policies. Transforming the micro-model to a macro-model significantly increases the efficiency of the computations. Further, the control policies can be in one or two dimensions, with rotational transformation allowing to use the 1-dimensional control policies to derive the optimal 2-dimensional control policy.

Figure 1:
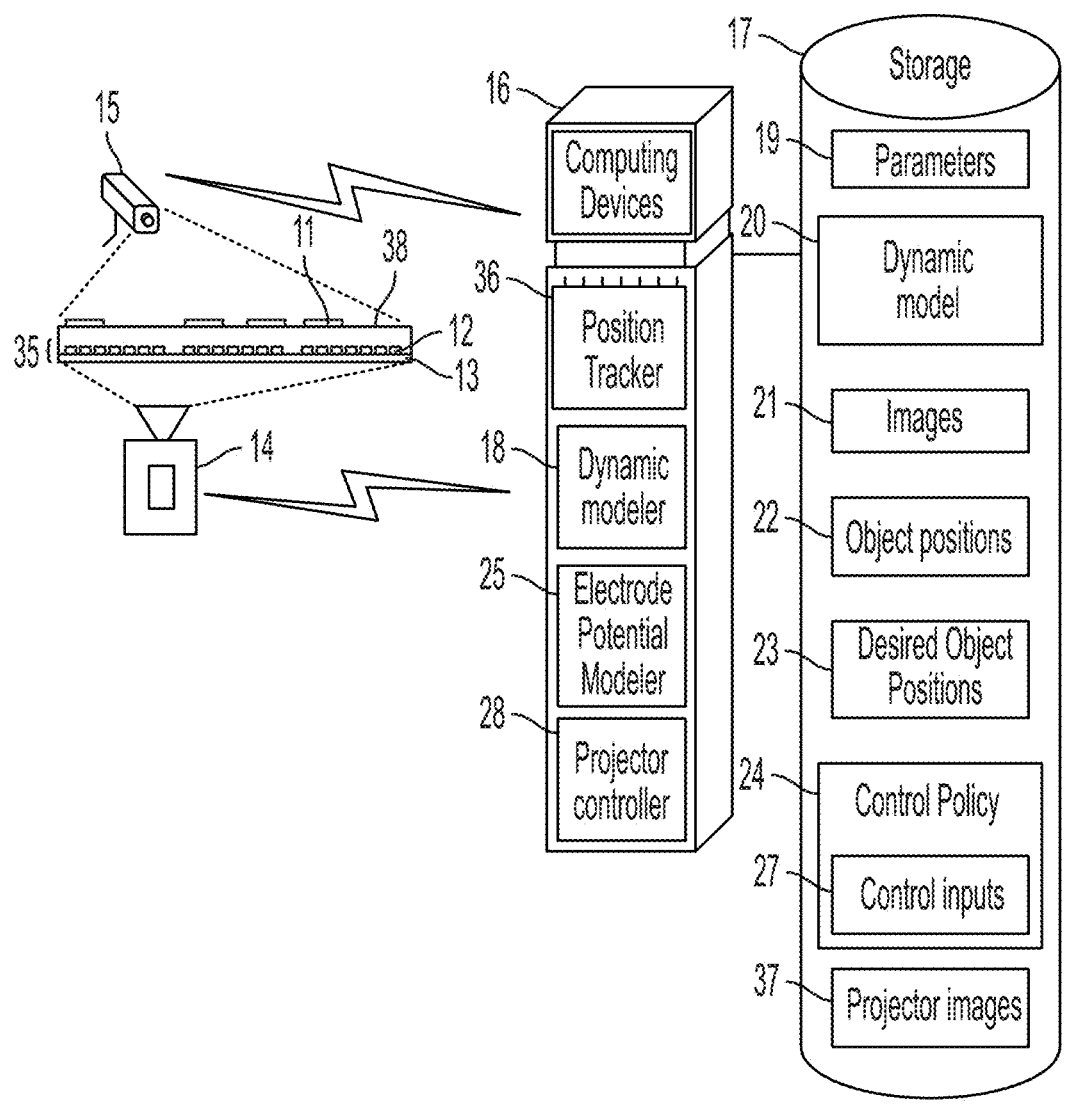
FIG. 1 is a block diagram showing a system for machine-learning enabled micro-assembly control with the aid of a digital computer

FIG. 1 is a block diagram showing a system for machine-learning enabled micro-assembly control with the aid of a digital computer. The system allows for coordinated assembly involving multiple objects 11, such as micro-objects. The size of the objects 11 vary between being on the nano scale (<1 μm), and micro-scale (as much as 100s of μm), though other sizes are possible. The objects 11 can be spherical, though other shapes are also possible, such as a rectangular shape, though still other shapes are also possible. In one embodiment, the diameter of the spherical objects 11 can be 20 μm to 50 μm, though other diameters are also possible. In one embodiment, the dimension of the rectangular objects 11 can be 200 μm×300 μm×100 μm, though other dimensions are also possible. The objects 11 are immersed in a dielectric fluid (not shown) contained within an enclosure (not shown), with a layer of film 38 being below the dielectric fluid contained within the enclosure. In one embodiment, the dielectric fluid is Isopar® M, manufactured by ExxonMobil Chemical Company of Spring, Tex., though other dielectric fluids are also possible. The dielectric fluid can include one or more additives, such as with di-2-ethylhexylsulfosuccinate (AOT) charge director molecules, though other additives are also possible. The objects 11 can be made out of aluminium oxide (AlOx), though other materials are possible. Each of the objects 11 can be a semiconductor chip, an integrated circuit, a particle, a nanodevice or structure, or any object which an array of electrodes can physically manipulate. In the description below, the objects 11 are referred to as micro-objects 11, though other ways to name the objects 11 are possible. In one embodiment, the film can be a 50 μm thick perfluroalkoxy (PFA) film, though other kinds of film of other thicknesses are possible.

Below the suspended micro-objects 11 are a plurality of programmable electrodes 12 forming an array 35, the electrodes 12 configured to generate a dynamic potential energy landscape for manipulating objects with both dielectrophoretic ("DEP") and electrophoretic ("EP") forces. The film is laminated on the electrodes 12. In one embodiment, the electrodes can be square shapes and made off copper, though other shapes and materials are also possible. In one embodiment, the dimensions of a square electrode 12 can be a 16 μm width and 100 nm thickness, though other dimensions are also possible in a further embodiment. The array 35 can include multiple rows of the electrodes 12, with each row including multiple electrodes 12.

The electric potentials generated by the electrodes 12 are controlled by array 13 of photo-transistors, the array including an active-matrix photo-transistor backplane that is set on glass. The multiple photo-transistors on the backplane form the array 13, with each of the photo-transistors in the array 13 being in control of the electric potentials generated by a single electrode 12. In particular, each of the photo-transistors in the array 13 is attached to one electrode 12. The array 13 of phototransistors can have additional characteristics, such as those described in Rupp et al., "Chiplet microassembly printer," 2019 *IEEE 69th Electronic Components and Technology Conference (ECTC)*, pages 1312-1315, May 2019, the disclosure of which is incorporated by reference.

Figure 2:
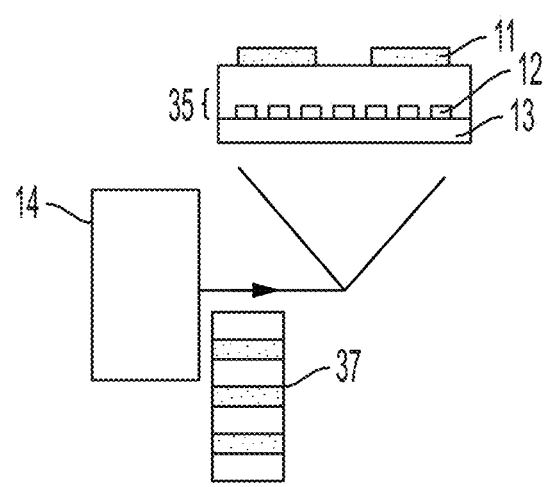
FIG. 2 is a diagram illustrating interactions between the video projector and the photo-transistor array of FIG. 1 in accordance with one embodiment.

The array 13 is optically addressed by a video projector 14 to enable dynamic control of the electrostatic energy potential and manipulation of the positions of multiple micro-objects 11 at the same time. In particular, the video projector 14 is used to address each photo-transistor controlled electrode 12, as illustrated by FIG. 2, allowing for facile zoom factor changes and stitching into larger arrays. FIG. 2 is a diagram illustrating interactions between the video projector 14 and the photo-transistor array 13 of FIG. 1 in accordance with one embodiment. The video projector 14 actuates the electrodes 12 by projecting pre-defined patterns: images 37 that are generated based on control inputs: the electric potentials to be generated by the electrodes to achieve desired motion of the micro-objects 11, as further described below. The pixelated light projected by the projector 14 that makes up the images charges each individual phototransistor 13 in the array to the degree necessary so that the electrode 12 charged by that phototransistor produces the desired electric potential.

Figure 3A:
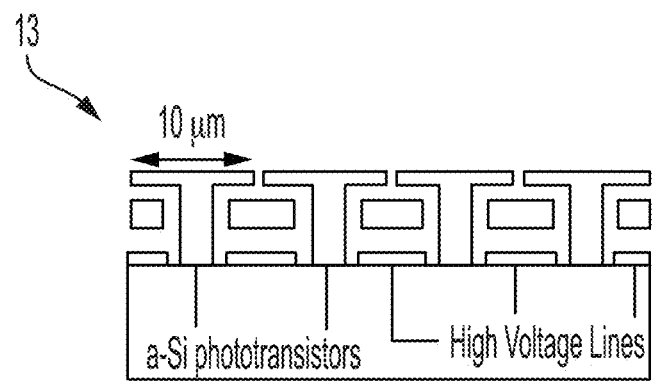
FIGS. 3A-3C show several views of an example of a photo-transistor array of FIG. 1 in accordance with one embodiment.
Figure 3B:
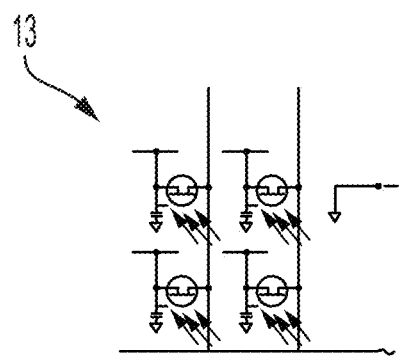
Figure 3C:
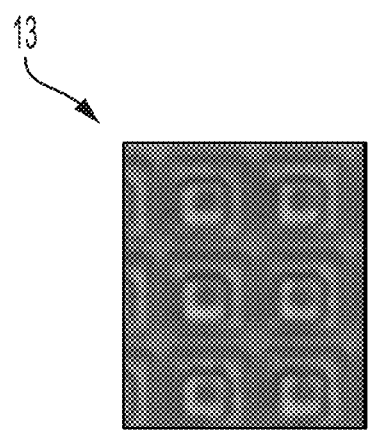

FIGS. 3(A)-3(C) show several views of an example of a photo-transistor array 13 of FIG. 1 in accordance with one embodiment. The photo-transistor array 13 shown with reference to FIGS. 3(A)-3(B) was built using a fabrication techniques similar to those used for building display transistor backplanes, making the fabrication techniques thus compatible with large areas (measuring meters). Voltages of up to +/−200V are controlled by these photo-transistors to display a dynamically varying complicated electric potential landscape. A single voltage signal is synchronized with optical addressing to charge storage capacitors on each pixel. Dynamic electric field patterns are generated by refreshing the projected image pattern (control input). The array 13 with 50 μm, 10 μm and even 3 μm pitch has been built, with pitch being distance between centers of the electrodes to which the phototransistors are attached. Dielectric fluid media (isopar M) and various additives are used to control the charge.

Figure 4A:
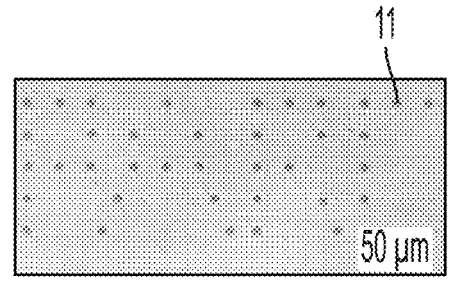
FIGS. 4(A)-4(B) are examples of micro-object patterns realized using the system of FIG. 1.
Figure 4B:
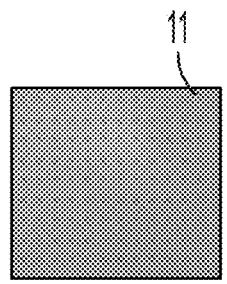

Returning to FIG. 1, the system further includesa high-speed camera 15 that tracks locations of micro-objects 11 being moved. Both the video projector 14 and the camera 15 are interfaced to one or more computing devices 16, which can control the electrodes 12 through the projector 14 to induce a formation of a desired micro-object 11 pattern. FIGS. 4(A)-4(B) are examples of micro-object 11 patterns realized using the system of FIG. 1. Other micro-object 11 patterns are also possible. In a further embodiment, another kind of sensor (such as utilizing capacitive sensing) could be used to measure and track a position of a micro-object. In a still further embodiment, electrode array 35 could have an integrated active matrix addressing electronics, the potential on each electrode of the array are updated electronically upon the electrode potentials that are necessary for desired micro-object movement having been generated.

The connections between the one or more computing devices 16 can be direct, such as a via wires or a wireless connection to physically proximate one or more computing devices 16, or the connection can be via an Internetwork to physically remote one or more computing devices 16, such as via the Internet or a cellular network. The one or more computing devices 16 include one or more processors. In one embodiment, the computer processors can be central processing units (CPUs), graphics processing unit (GPU), or a mixture of CPUs and GPU, though still other kinds of processors or a mixture of processors are possible. In one embodiment, two or more of the processors can perform processing in parallel, as further described in U.S. patent application Ser. No. 17/098,816, filed Nov. 16, 2020, entitled System and Method For Multi-Object Micro-Assembly Control With The Aid of A Digital Computer, to Matei et al., the disclosure of which is incorporated by reference. Additional efficiency and improved scalability can be obtained through parallel computation capabilities for tracking multiple particles and for voltage pattern generation.

While the one or more computing devices 16 are shown as a server, other types of computer devices are possible. The computing devices 16 can include one or more modules for carrying out the embodiments disclosed herein. The modules can be implemented as a computer program or procedure written as source code in a conventional programming language and is presented for execution by the processors as object or byte code. Alternatively, the modules could also be implemented in hardware, either as integrated circuitry or burned into read-only memory components, and each of the computing devices 16 can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the computing device 16 can include other components found in programmable computing devices, such as input/output ports, network interfaces, and non-volatile storage, although other components are possible. In the embodiment where the computing devices 16 are servers, the server can also be cloud-based or be dedicated servers.

The one or more computing devices 16are interfaced to a storage 17 and execute a dynamic modeler 18 that obtains parameters 19 of the system, stores the parameters 19 in the storage 17, and models capacitance between the electrodes 12 and the micro-objects. The parameters 19 can include the diameter of the micro-objects 11, the dimensions of the electrodes 12, the dielectric fluid constant (e.g. as ε=2), the fixed positions of the electrodes 12, material of the micro-objects 11 and electrodes 12, and the vertical distance between the micro-objects 11 and the electrodes 12 ("height" of the micro-objects 11). Other parameters 19 are still possible.

Figure 5:
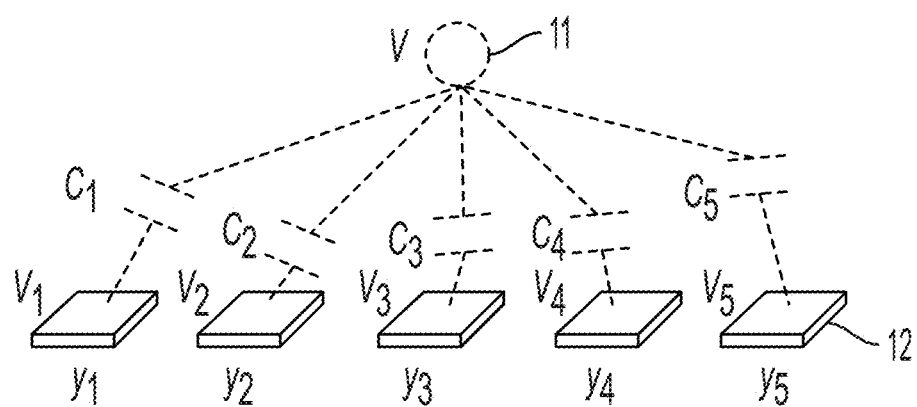
FIG. 5 is diagram illustrating capacitive-based interactions between one micro-object and five electrodes of the system of FIG. 1 in accordance with one embodiment.

The design of the control policy is based on the dynamical model of the micro-object motion, under the action of the electric field generated by the electrode array. The result of applying electric potentials to the electrodes 12 is the generation of dielectrophoretic and electrophoretic forces that act on the micro-objects 11. A viscous drag force proportional to the velocity opposes the micro-object's motion (with the drag force being proportional to the velocity in non-turbulent flows, that is, when the Reynolds number is small). Due to the negligible mass of the micro-object, acceleration is ignored. Accordingly, the dynamic model 20 for the micro-object motion can be described by:

$$\mu \dot{x} = F_x(x,y)$$

$$\mu \dot{y} = F_y(x,y),$$

where (x, y) denotes the micro-object 11 position measured at the chilplet's center of mass, μ is the fluid dependent viscous coefficient, and $F_x(x, y)$ and $F_y(x, y)$ are projections on the x and y axis, respectively of the force induced by the potential field. The forces $F_x$ and $F_y$ are expressed as functions of the potential energy of the micro-object. The potential energy is computed by using a capacitive-based electrical circuit that lumps the interaction between the electrodes and the micro-object. FIG. 5 is diagram illustrating capacitive-based interactions between one micro-object 11 and five electrodes of the system of FIG. 1 in accordance with one embodiment. The micro-object and the electrodes act as metal plates; hence the capacitances of these capacitors are dependent on the micro-object position. Let U(x, y) denote the micro-object's potential energy, The forces $F_x$ and $F_y$ can be formally expressed as $$F_x(x, y) = \frac{\partial U}{\partial x}(x, y) \text{ and } F_y(x, y) = \frac{\partial U}{\partial y}(x, y).$$

The potential energy can be expressed in terms of the circuit capacitances:

$$U(x, y) = \frac{1}{2} \sum_{i=1}^{N} C_i(x, y)[V_i - V(x, y)]^2,$$

where $C_i$ (x, y) is the capacitance between the micro-object and electrode i, $V_i$ is the electric potential of electrode i, V(x, y) is the electric potential of the micro-object assumed uniformly distributed across the micro-object. In integer N is the number of actuated electrodes. The micro-object potential can be explicitly computed in terms of the electrode potentials, by solving for the voltages and currents in the electrical circuit show with reference to FIG. 5. In particular the steady state micro-object potential is given by $$V(x, y) = \frac{1}{\sum_{i=1}^{N} C_i(x, y)} \sum_{i=1}^{N} C_i(x, y) V_i,$$

Figure 6:
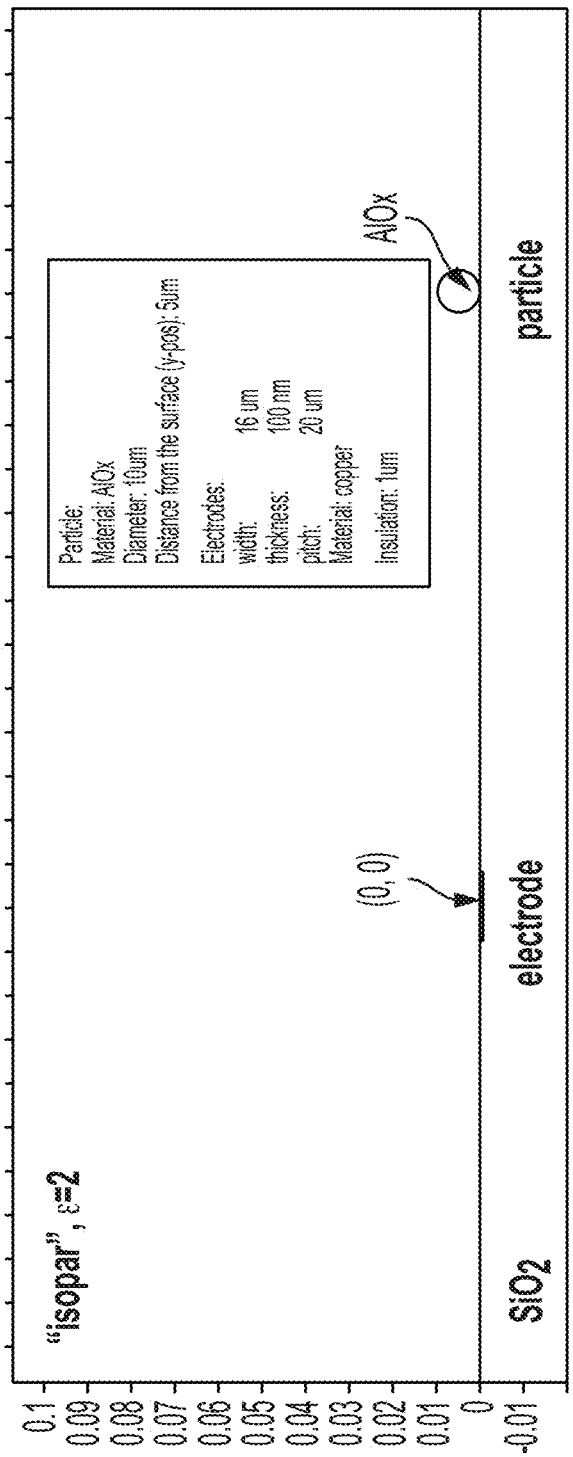
FIG. 6 is a diagram showing the COMSOL model of two conductors (spherical micro-object and an electrode) for capacitance computation in accordance with one embodiment.

Feedback control design requires explicit expressions for the capacitances between the micro-object and electrodes. The capacitance modeler 18 creates the model 20 using high fidelity simulations using the COMSOL Multiphysics® software developed by COMSOL, Inc. of Burlington, Mass. ("COMSOL"), though other kinds of simulations using other kinds of software are also possible. For symmetric micro-objects (e.g., beads) assuming the electrodes are symmetric also, the capacitances are estimated by simulating a 2-dimensional electrostatic COMSOL model. This implies that the capacitance function is of the form $C_i(\eta) = C(\|\eta - \eta_i\|)$, where $\eta^T = [x, y]$ denotes the micro-object position, and $\eta_i^T = [x_i, y_i]$ is the fixed position of electrode i. FIG. 6 is a diagram showing the COMSOL model of two conductors (spherical micro-object and an electrode) for capacitance computation in accordance with one embodiment. With reference to FIG. 5, the electrode's position is (0,0). As shown with reference to FIG. 6, in the COMSOL model, a 16 μm width and 100 nm thickness copper plate, and a 10 μm diameter, aluminium oxide (AlOx) spherical object are surrounded by a dielectric with the same properties as the isopar-M solution. The capacitance matrix entries are computed from the charges that result on each conductor when an electric potential is applied to one of them and the other is set to ground. The COMSOL simulations do reflect the field distortion when the micro-object approaches the electrode. The COMSOL electrostatic model has as parameters, the diameter of the sphere, the electrode dimensions, the dielectric fluid constant (ε=2) and the positions and material of the sphere and electrode. The micro-object height is fixed (z=5 μm) and the position of the micro-object is varied on the x-axis over the interval [−1 mm, 1 mm]. Due to the size of the micro-object versus the size of the electrodes, fringe effects (electric field distortions at the edges) are significant. The capacitance function is parametrized using error functions:

$$C(\xi) = \sum_{i=1}^{m} a_i \left[ \Phi\left(\frac{\xi + \delta}{c_i}\right) - \Phi\left(\frac{\xi - \delta}{c_i}\right) \right], \text{ where}$$

-continued $$\Phi(\xi) = \frac{1}{\sqrt{\pi}} \int_{-\xi}^{\xi} e^{-t^2} dt$$

is the error function, is the distance between the center of the sphere and the electrode center assumed at the origin, $\alpha_i$ and $c_i > 0$ are positive scalars, and δ is half of the electrode pitch, i.e., 10 μm in this example.

Figure 7:
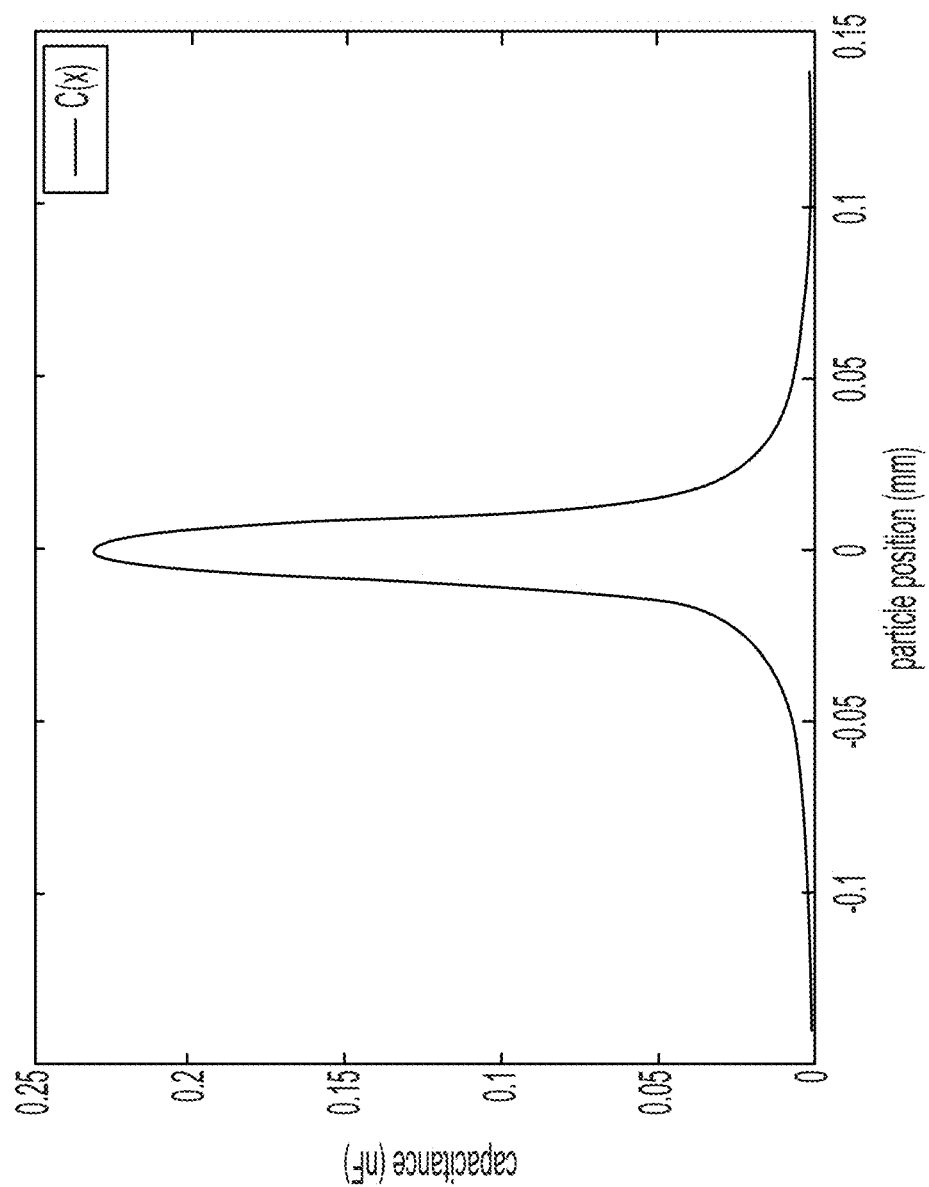
FIG. 7 shows the capacitance function fitted with training data generated by COMSOL simulations in accordance with one embodiment.

FIG. 7 shows the capacitance function fitted with training data generated by COMSOL simulations in accordance with one embodiment. FIG. 7 depicts C(ξ), the capacitance between the micro-object and the electrode as a function of the micro-object horizontal position, where the numerical values were fitted on the error function parameterization. The 1D model can be mapped to a 2D model by using the transformation $\xi \to \sqrt{x^2 + y^2}$, which results in a capacitance function $$C(x, y) = \sum_{i=1}^{m} a_i \left[ \Phi\left(\frac{\sqrt{x^2 + y^2} + \delta}{c_i}\right) - \Phi\left(\frac{\sqrt{x^2 + y^2} - \delta}{c_i}\right) \right].$$

Figure 8:
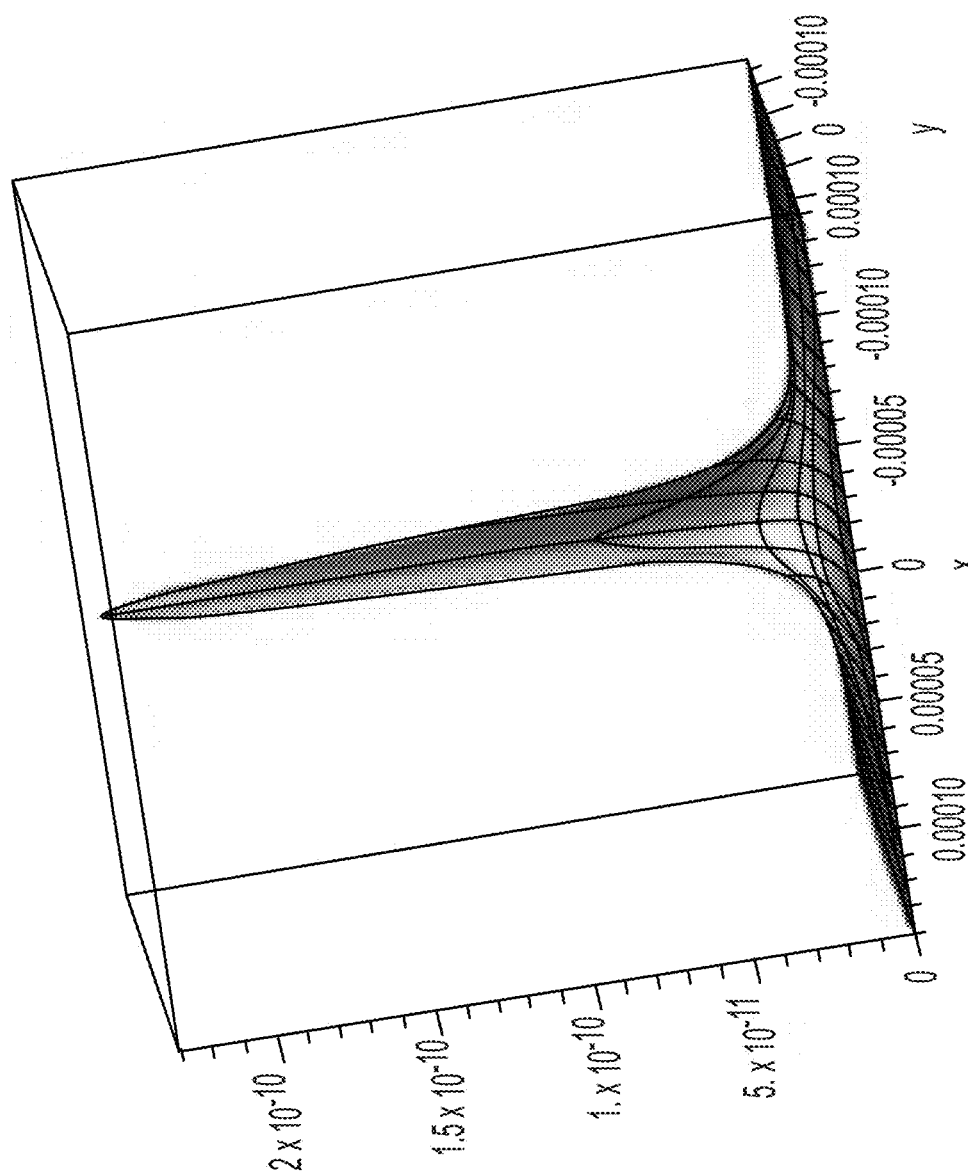
FIG. 8 is a diagram showing 2D capacitance function determined from the 1D model using the symmetry property in accordance with one embodiment.

For the sphere shape chiplet, considering only one terms in the parameterization of the capacitance function, the resulting 2D shape is depicted in FIG. 8. FIG. 8 is a diagram showing 2D capacitance function determined from the 1D model using the symmetry property in accordance with one embodiment.

The one or more computing devices 16 further execute a position tracker 36 that analyzes the images 21 captured by the high-speed camera 15 (or another kind of sensor) to determine the positions 22 of the micro-objects 11. The positions 22 and the dynamic capacitance model 20 are used to determine a control policy 24, which includes the control inputs 27 (the electric potentials) that need to be generated by the electrodes 12 induce the electrodes to the desired positions.

The determination of the control policy 24 is performed using electrode potential modeler 25 executed by the one or more computing devices 16. As mentioned above, the determination of the control policy 24 involves transforming a micro-model (the dynamic model 20 with distributed parameters) to a macro-model (the dynamic model 20 with a continuous distribution) and using machine-learning based optimization to find the control policies. Transforming the micro-model to a macro-model significantly increases the efficiency of the computations. Further, the control policies 24 can be in one or two dimensions, with rotational transformation allowing to use the 1-dimensional control policies to derive the optimal 2-dimensional control policy. To enable tractability, a mean field-like approximation of the dynamic model 20 is used, where instead of considering a discrete distribution of the array potentials, a continuous distribution is assumed. Under this assumption, a bi-modal control policy, where the voltage distribution shifts polarity just in front of the micro-object does indeed induce micro-object motion to a desired direction. The description below starts with the one-dimensional (1D) case and show how the approach is extended to the 2-dimensional (2D) case. In addition, as described below, the policy is derived by solving a regression problem in terms of the electrode 12 voltages, where the a machine learning algorithm, automatic differentiation in particular, is used to compute the gradients of the micro-object potential function.

The intuition behind going from a discrete representation to a continuous one can be seen in the expression of the micro-object potential $$V(x) = \frac{1}{\sum_{i=1}^{N} C_i(x)} \sum_{i=1}^{N} C_i(x) V_i.$$

In particular V(x) can be interpreted as the expected value of a discrete random function V(Y) over a discrete distribution $p_i(x) = C_i(x)/\sum_{i=1}^{N} C_i(x) = \tilde{C}_i(x)$. The mass function $p_i(x)$ can be interpreted as a conditional probability $p_i(x) = \Pr(Y = y_i | X = x)$, and hence the micro-object potential can be expressed as $V(x) = E[V(Y)|X = x]$, where V(y) is a function that reflects the potential at each point y. The discrete probability distribution can be seen as a discretization of a continuous probability distribution, i.e., $p_i(x) = \int_{y_i - \delta}^{y_i + \delta} f(y|x) dy$, where $y_i$ is the position of the $i^{th}$ electrode and $\delta$ is half of the electrode pitch. The parameterization of the capacitance function in terms of the error functions tells us that the conditional probability density function (pdf) is a mixture of Gaussian functions. For the sphere-shaped micro-object 11 example, the mixture has only one term, and hence the capacitance is expressed as $$C_i(x) = a\left[\Phi\left(\frac{x - y_i + \delta}{c}\right) - \Phi\left(\frac{x - y_i - \delta}{c}\right)\right] = 2af(y|x), \text{ where}$$

$$f(y|x) = \frac{1}{\sqrt{2\pi\sigma^2}} e^{-\frac{(y-x)^2}{2\sigma^2}}, \text{ where}$$

$$\sigma = \frac{c}{\sqrt{2}}.$$

Therefore, the micro-object potential in the continuous representation can be expressed as $\bar{v}(x) = E[V(Y)|X=x]$, where Y is a continuous random variable with a Gaussian distribution, i.e., $Y \sim \mathcal{N}(X, \sigma)$, and V(Y) is a function which assigns an electric potential to each point y. The potential energy can now be represented as $U(x) = \alpha E[(V(Y) - \bar{v}(X))^2 | X = x]$, and thus follows that the 1D micro-object dynamics is given by the following partial differential equation $$\frac{\partial x}{\partial t} = \frac{\partial U(x)}{\partial x}.$$

where $U(x) = \alpha E[(V(Y) - \bar{v}(X))^2 | X = x]$, and $\bar{v}(x) = E[V(Y)|X=x]$.

The electrode potential modeler 25 models the function that determines the allocation of the potential as a neural network (NN) with two hidden layers of size 60 and tanh as activation function, that is $V(y) = V(y; \beta)$, where $\beta$ is the vector of parameters encompassing the weights and the biases of the NN. The following optimization problem can be formulated:

$$\max_\beta \frac{\partial U}{\partial x}(x) \quad (1)$$

$$\text{s.t.} : U(x; \beta) = E[(V(Y; \beta) - \bar{v}(X; \beta))^2 | X = x]$$

$$\bar{v}(X; \beta) = E[V(Y; \beta) | X]$$

The electrode potential modeler 25 optimal solution of (1) maximizes the micro-object solution in the positive direction. For the negative direction, the sign of the cost function describing the partial derivative of the potential energy U can be changed. The electrode potential modeler makes use of Gauss quadrature rules often found in the theory of generalized chaos polynomials, as described in A. O'Hagan, "Polynomial Chaos: A Tutorial and Critique from a Statistician's Perspective," University of Sheffield, UK, May 2013; N. Wiener, "The Homogeneous Chaos," *Am. J. Math.*, vol. 60, no. 4, pp. 897-936, 1938; D. Xiu, D. Lucor, C.-H. Su, and G. Em Karniadakis, "Performance Evaluation of Generalized Polynomial Chaos," in *Computational Science—ICCS 2003: International Conference, Melbourne, Australia and St. Petersburg, Russia*, Jun. 2-4, 2003 Proceedings, Part IV, Berlin, Heidelberg, 2003, pp. 346-354, the disclosures of which are incorporated by reference. Gauss quadrature rules provide the tool to efficiently evaluate the conditional expectations. Thus, the expectation of a function of a random variable with a Gaussian distribution, can be accurately approximated using Gauss-Hermite quadrature. Accordingly, the expectation of V(Y; β) is given by $$\bar{v}(x; \beta) = E[V(Y; \beta) | X = x] \approx \frac{1}{\sqrt{\pi}} \sum_{i=1}^{n} w_i V(\sqrt{2}\sigma y_i + x; \beta),$$

where n is the number of sample points, $y_i$ are the roots of the physicists' version of the Hermite polynomial $H_n(y)$ and $w_i$ are associated weights given by $$w_i = \frac{2^{n-1} n! \sqrt{\pi}}{n^2 [H_{n-1}(yt)]^2}.$$

Similarly, the variance of V(Y; β) can be approximated as $$U(x; \beta) = E[(V(Y; \beta) - \bar{v}(X; \beta))^2 | X = x] \approx$$

$$\frac{1}{\sqrt{\pi}} \sum_{i=1}^{n} w_i [V(\sqrt{2}\sigma y_i + x; \beta) - \bar{v}(x; \beta)]^2.$$

Hence, the optimization problem (1) becomes $$\max_\beta \frac{\partial \hat{U}}{\partial x}(x) \quad (2)$$

$$\text{s.t.} : \hat{U}(x; \beta) = \frac{1}{\sqrt{\pi}} \sum_{i=1}^{n} w_i [V(\sqrt{2}\sigma y_i + x; \beta) - \hat{v}(x; \beta)]^2$$

$$\hat{v}(X; \beta) = \frac{1}{\sqrt{\pi}} \sum_{i=1}^{n} w_i V(\sqrt{2}\sigma y_i + x; \beta)$$

The electrode potential modeler 25 uses a machine learning algorithm, automatic differentiation to perform the optimization according to equation (2). In particular, the electrode potential modeler 25 can leverage the automatic differentiation feature of Autograd Module of PyTorch® software developed by Facebook, Inc. of Menlo Park, Calif. and described by Maclaurin et al., "Autograd: Effortless gradients in numpy," *ICML 2015 AutoML Workshop*, 2015, the disclosure of which is incorporated by reference, to evaluate the cost function which requires the computation of the partial derivative of $\hat{U}(x)$ as a function of the NN weights and biases, though other implementations of automatic differentiation are possible. To solve the optimization of equation (2), the electrode potential modeler 25 runs Adam gradient based optimization algorithm that utilizes results of automatic differentiation, such as described in D. P. Kingma and J. Ba, *Adam: A Method for Stochastic Optimization.* 2014 (though other implementations are possible), for 1500 iteration with a stepsize α=0.001 (though in a further embodiment, other numbers of iterations and other stepsizes are possible).

Figure 9:
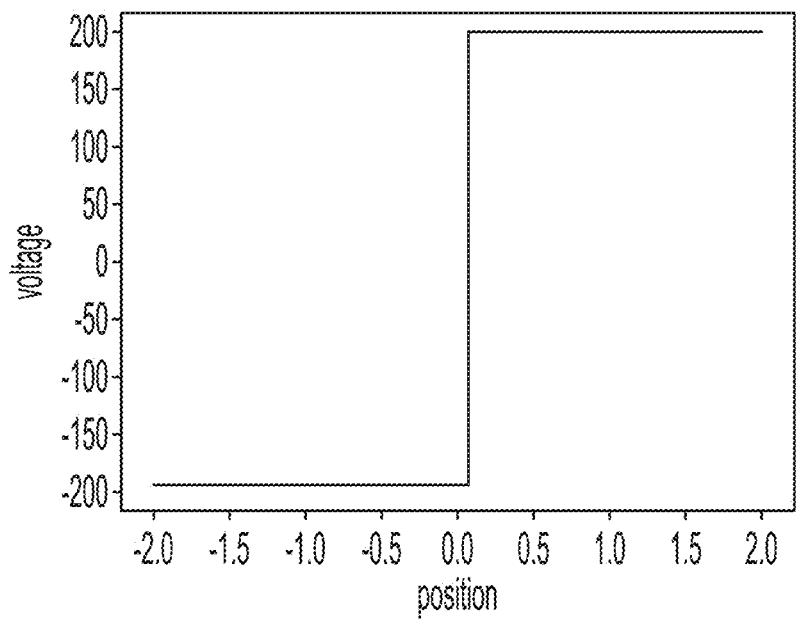
FIG. 9 is a diagram showing a control policy obtained using by solving equation (2) in accordance with one embodiment.

As also described below, experimentally, the optimization problem was solved for x=0, and a sequence of the number of sample points n∈{10,20,30,40,50}. They all resulted in the same type of control policy 24, as shown in with reference to FIG. 9 for n=30. FIG. 9 is a diagram showing a control policy obtained using by solving equation (2) in accordance with one embodiment. The resulting control policy is a bi-modal control policy that shows the sudden change in polarite just in front of the micro-object. Due to the translational symmetry of the micro-object dynamics, sufficient to solve the optimization problem for x=0 only.

Due to the physical limitations of the addressability of the electrode array, the special case of a bi-modal control policy is considered by the electrode potential modeler 25:

$$V(y) = \begin{cases} 0 & y \le x + b \\ V_{max} & y > x + b \end{cases}$$

The optimal parameters of the policy are determined by the electrode potential modeler 25. In particular, for b=0.4307σ the micro-object will move at maximum speed in the positive direction (i.e., $\dot{x}>0$) and for b=−0.4307σ the will move the micro-object at maximum speed in the negative direction (i.e., $\dot{x}<0$), where σ is the variance of the Gaussian random variable Y.

Note that activating all of the electrodes 12 does not make sense, but only the ones in the interval [x+b, 4σ], hence cutting the electrode activations after 4σ does not affect the generated force. Hence, this interval imposes a particular length of the image pattern. The discretized control policy is given by $V_i=V_{max}$ for $y_i \in$ [x+b, 4σ], and unassigned otherwise, where $y_i$ is the position of electrode i, which is exactly the control scheme used experimentally. Therefore, the discretized control policy 24 generated for moving a micro-object in one dimension is given by $V_i=V_{max}$ for $y_i \in$ [x+b, 4σ], and unassigned (0) otherwise, where $y_i$ is the position of electrode i.

Figure 10:
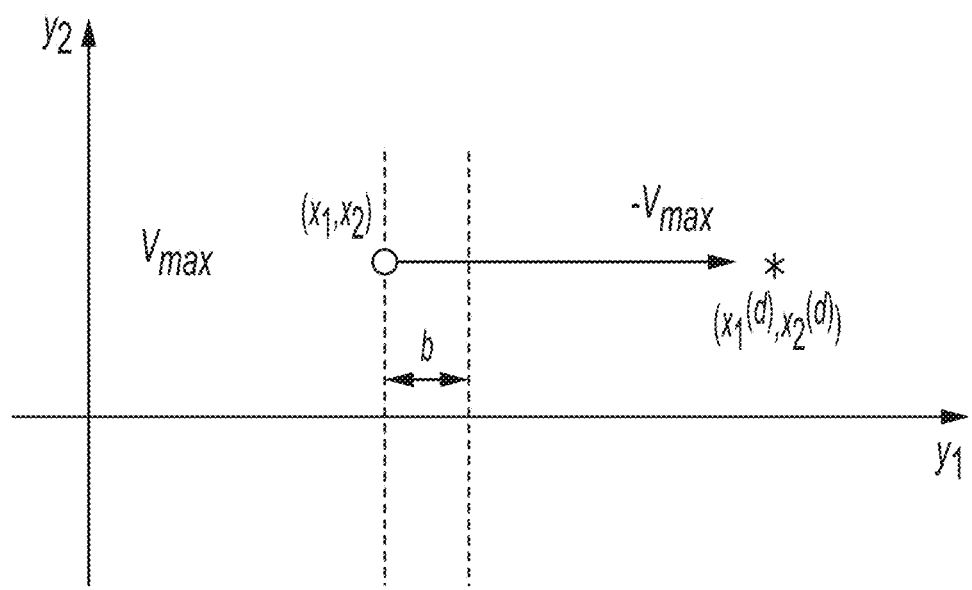
FIG. 10 is a diagram illustrating a control policy for moving a micro-object to a desired position in two dimensions in accordance with one embodiment.

The results given above can also be extended to moving a micro-object 11 in two dimensions. The micro-object 11 position is denoted by $x=(x_1, x_2)$ and by $y^{(i)}=(y_1^{(i)}, y_2^{(i)})$ is denoted the position of electrode i. The micro-object 11 dynamics becomes $$\mu \dot{x} = \nabla U(x),$$

where μ is the viscous coefficient, and U(x) denotes the micro-object's potential energy. As is in the 1-dimensional case, the potential energy is given by $$U(x) = \frac{1}{2} \sum_{i=1}^{N} C_i(x)[V_i - V(x)]^2,$$

where V(x) denotes the micro-object electric potential, $C_i(x)=C(\|x-y^{(i)}\|)$ represents the capacitance between the micro-object and electrode i a position $y^{(i)}$, and $V_i$ represents the potential of electrode i. Similar to the 1-dimensional case, an assumption is made that the capacitance $C_i$ can be represented as the un-normalized discretization of a multi-variable Gaussian pdf, that is:

$$C_i(x) \sim \int_{y_1^{(i)}-\delta/2}^{y_1^{(i)}+\delta/2} \int_{y_2^{(i)}-\delta/2}^{y_2^{(i)}+\delta/2} f(y|x)dy,$$

where Y~$\mathcal{N}$ (X, σ²I). The control objective is to determine a distribution for the electrode potential that moves the micro-object towards a position $x^{(d)}$. FIG. 10 is a diagram illustrating a control policy 24 for moving a micro-object to a desired position in two dimensions in accordance with one embodiment. The scenario shown with reference to FIG. 10 is where the motion is parallel to the $y_1$ axis. This is sufficient since the potential distribution for other scenarios are derived by performing a rotational transformation as the micro-object dynamics is endowed with translational and rotational symmetries. The corresponding 2D control policy is $$V(y) = V(y_1, y_2) = \begin{cases} V_{max} & y_1 \le x_1 + b, \forall y_2 \\ -V_{max} & y_1 > x_1 + b, \forall y_2 \end{cases}$$

All results determined for the 1D case concerning the choice of b to generate the maximum force hold for the 2D case, as well. Note that discretization of the ideal control policy will introduce some errors since the micro-object may not be exactly on top of an electrode. That is why, the experimental policy is based on a pattern that includes neighboring electrodes for cases when electrodes are not exactly aligned with the direction towards the desired position.

By using the rotational symmetries of the model, the electrode potential modeler 25 determines the 2D control policy for any direction of motion. Let $x^{(0)}$ be the current micro-object position and let $x^{(d)}$ be the desired micro-object position. Then the control policy 24 is given by:

$$V(y) = V(y_1, y_2) = \begin{cases} V_{max} & y_2 \le x_2^{(b)} + \frac{1}{s}(y_1 - x_1^{(b)}) \\ -V_{max} & y_2 > x_2^{(b)} + \frac{1}{s}(y_1 - x_1^{(b)}), \end{cases}$$

where $$x^{(b)} = x^{(0)} + b \frac{x^{(d)} - x^{(0)}}{\|x^{(d)} - x^{(0)}\|} \text{ and}$$

$$s = \frac{x_2^{(d)} - x_2^{(0)}}{x_1^{(d)} - x_1^{(0)}}$$

ensure micro-object motion towards the desired position $x^{(d)}$ for positive b and away from $x^{(d)}$ for negative b.

Thus, by taking as input the dynamic model 20, the initial micro-object position 22, and the desired micro-object position 23, the electrode potential modeler 25 can derive the control policy for moving a micro-object 11 from an initial position 22 to a desired micro-object position 23. The control policy 24 is designed for moving a single micro-object position at a time, as the micro-objects in this design do not come close enough to each other to cause a significant micro-object-to-micro-object interaction (with the exact distance at which one micro-object 11 needs to stay away from another micro-object to avoid causing interactions that need to be accounted for being determined in accordance with the geometry and electric potential of the micro-objects—generally, to cause micro-object-to-micro-object interactions, the distance between two micro-objects has to be on the same order of magnitude as the distance from micro-objects 11 to electrodes 12). The control policy 24 generated by the electrode potential modeler is used by a projector controller 28 executed by the one or more computing devices 16 to map the control policy to the images 37 that are provided to the video projector 14, and which in turn projects the images 37 to the photo-transistors controlling the electrodes 11, thus actuating the movement of the micro-objects 11. The mapping can be done as described in U.S. Patent Application Publication No. US20200207617, entitled "Micro-assembler system for manipulating micro-objects," to Plochowietz et al., published Jul. 2, 2020, the disclosure of which is incorporated by reference. In a further embodiment, if the electrode array 35 has an integrated active matrix addressing electronics, the potential on each electrode of the array are updated electronically upon the control policy 24 having been generated.

Figure 11:
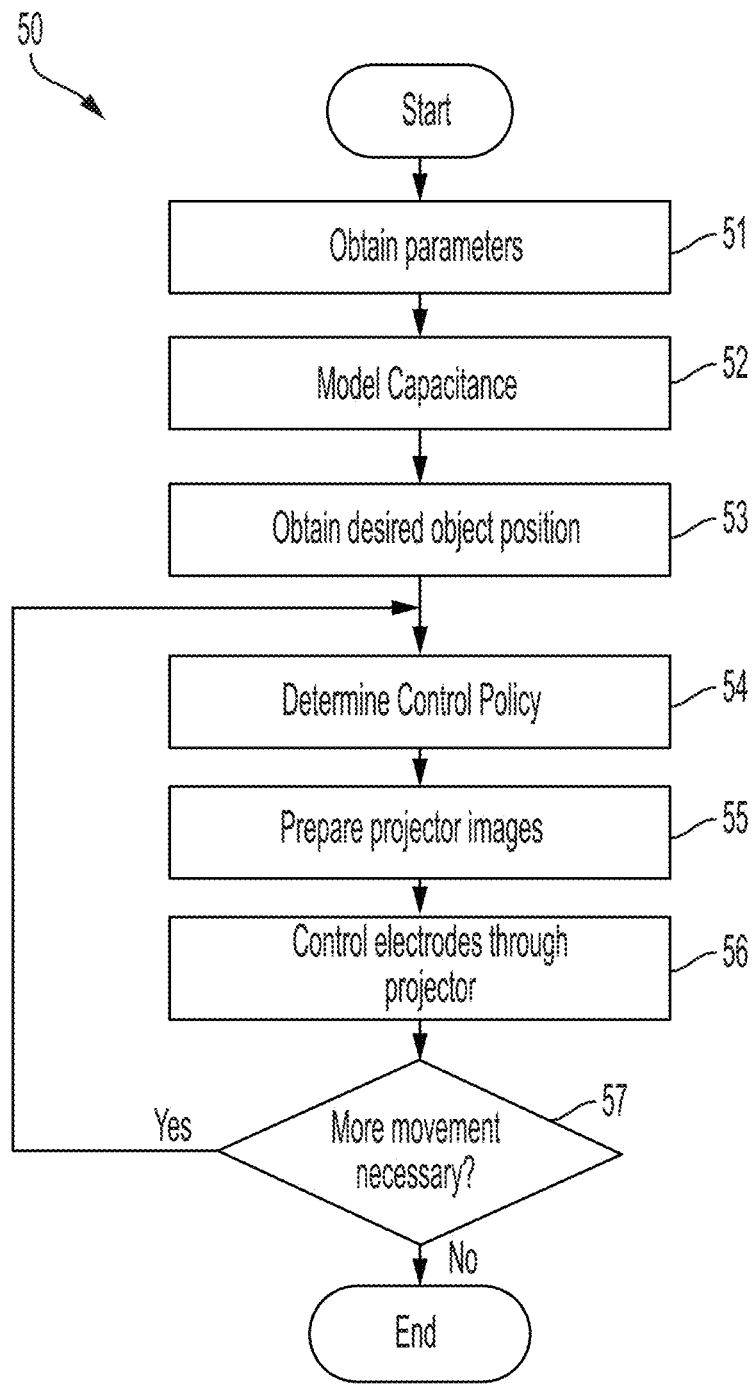
FIG. 11 is a flow diagram showing a method for machine-learning enabled micro-assembly control with the aid of a digital computer.

Transforming the dynamic model from a discrete formulation to a continuous formulation allows to rewrite the constraints of the model as expectations. In turn, this allows to rediscritize the model in a much more efficient way so that allows to derive more efficiently the optimal electrode potentials using automatic differentiation. FIG. 11 is a flow diagram showing a method 50 for multi-object micro-assembly control with the aid of a digital computer. The method 50 can be performed using the system of FIG. 1. Parameters of the system are obtained, such as diameter of the micro-objects, the dimensions of the electrodes, the dielectric fluid constant, the initial positions and material of one or more micro-objects that need to be moved and of the electrodes (which can be obtained using the high-speed camera or another kind of sensor), and the height of the micro-objects, though other parameters are possible (step 51). A capacitance-based dynamic model of the motion of the micro-objects is created using the parameters (step 52), as further described below with reference to FIG. 10 and as described above with reference to FIG. 1. A desired position of at least one of the micro-objects is obtained (step 53). A control policy is determined using the initial positions of one of the micro-objects and a desired position of that micro-object as described above with reference to FIG. 1 (step 54). Briefly, the dynamic model with distributed parameters is transformed into a continuous representation of the dynamic model and automatic differentiation together with Gauss quadrature rules are used to solve an optimization problem to derive electrode potentials necessary to move the micro-object to a desired position, either in one or two dimensions.

The derived electrode potentials are mapped to images for display by the video projector (step 55) and electrodes in the electrode array are controlledto induce the movement of the micro-object to desired positions (step 56). If additional movement is necessary (step 57), such as if other micro-objects need to be moved or if the micro-object that was moved did not reach the desired position (determined using the high speed camera or another kind of sensor), the method returns to step 54. If no additional movement is necessary (step 57), the method 50 ends.

In a further embodiment, if the electrode array 35 has an integrated active matrix addressing electronics, the potential on each electrode of the array are updated electronically upon the control policy 24 having been generated instead through images projected by the projector in step 54.

Figure 12:
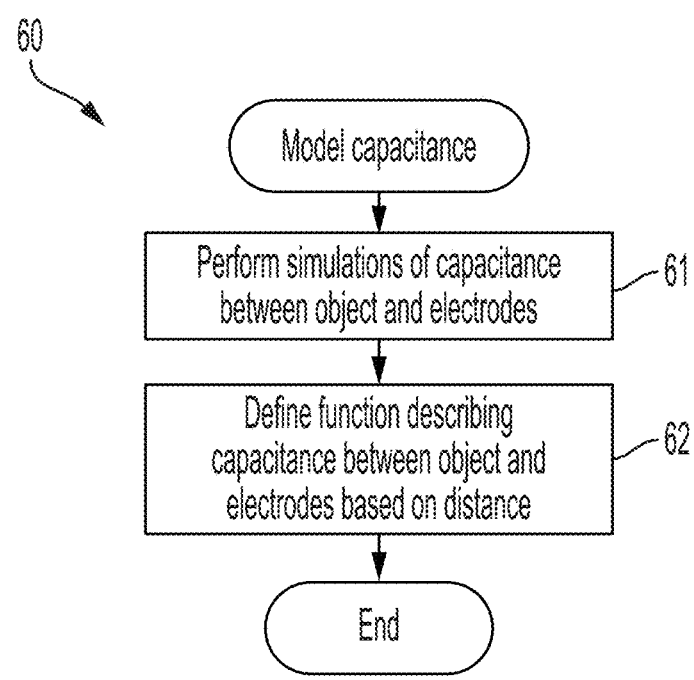
FIG. 12 is a flow diagram showing a routine for modeling micro-object motion based on capacitance for use in the method of FIG. 11 in accordance to one embodiment.

As the system and method use only one micro-object at a time and the micro-objects do not come close enough to generate micro-object-micro-object interactions, the dynamic model needs to only account for interactions between one micro-object and the electrodes. The capacitance-based model of motion of the micro-objects accounts both for capacitance between a micro-object and an electrode and a capacitance between two different micro-objects. FIG. 12 is a flow diagram showing a routine 60 for modeling micro-object motion based on capacitance for use in the method 50 of FIG. 11 in accordance to one embodiment. Simulations, such as COMSOL simulations, are performed for capacitance between an electrode and a micro-object at multiple distances as described above with reference to FIG. 1 (step 61). A function describing the dependence between the capacitance between an electrode and a micro-object is defined based on the simulations regarding the capacitance between the micro-object and the electrodes, as described above with reference to FIG. 1 (step 62), ending the routine 60.

The system and method described above leverage a bi-modal control policy that is derived using a machine learning algorithm and Gauss quadrature rules to derive the necessary electrode potentials. Additional mathematical reasoning and experimental details behind the derivation and application of the control policy is given below. The reasoning and details are provided for purposes of illustration and not limitation.

Control Design: 1D Case

As described above, the intuition behind going from a discrete representation to a continuous one can be seen in the expression of the micro-object potential $$V(x) = \frac{1}{\sum_{i=1}^{N} C_i(x)} \sum_{i=1}^{N} C_i(x) V_i.$$

In particular $V(x)$ can be interpreted as the expected value of a discrete random function $V(Y)$ over a discrete distribution $p_i(x) = C_i(x)/\sum_{i=1}^{N} C_i(x) = \tilde{C}_i(x)$. The mass function $p_i(x)$ can be interpreted as a conditional probability $p_i(x) = \Pr(Y=y_i|X=x)$, and hence the micro-object potential can be expressed as $V(x) = E[V(Y)|X=x]$, where $V(y)$ is a function that reflects the potential at each point y. The discrete probability distribution can be seen as a discretization of a continuous probability distribution, i.e., $p_i(x) = \int_{y_i-\delta}^{y_i+\delta} f(y|x) dy$, where $y_i$ is the position of the $i^{th}$ electrode and $\delta$ is half of the electrode pitch. The parameterization of the capacitance function in terms of the error functions tells us that the conditional probability density function (pdf) is a mixture of Gaussian functions. For the sphere shaped example, the mixture has only one term, and hence the capacitance is expressed as $$C_i(x) = a\left[\Phi\left(\frac{x-y_i+\delta}{c}\right) - \Phi\left(\frac{x-y_i-\delta}{c}\right)\right] = 2af(y|x), \text{ where}$$

$$f(y|x) = \frac{1}{\sqrt{2\pi\sigma^2}} e^{-\frac{(y-x)^2}{2\sigma^2}}, \text{ where } \sigma = \frac{c}{\sqrt{2}}.$$

Therefore, the micro-object potential in the continuous representation can be expressed as $\bar{v}(x)=E[V(Y)|X=x]$, where Y is a continuous random variable with a Gaussian distribution, i.e., $Y \sim \mathcal{N}(X, \sigma)$, and V(Y) is a function which assigns an electric potential to each point y. The potential energy can now be represented as $U(x)=\alpha E[(V(Y)-\bar{v}(X))^2|X=x]$, and it follows that the 1D micro-object dynamics is given by the following partial differential equation $$\frac{\partial x}{\partial t} = \frac{\partial U(x)}{\partial x}. \quad (3)$$

where $U(x) = \alpha E[(V(Y) - \bar{v}(X))^2 | X = x]$, and $\bar{v}(x) = E[V(Y) | X = x]$.

The following result shows that a bi-modal potential distribution is sufficient to move the micro-object towards the desired position.

Proposition 1 Let the function that describes the electric potential allocation be chosen as $$V(y) = \begin{cases} V_{max} & y \leq x+b \\ -V_{max} & y > x+b, \end{cases} \quad (4)$$

where $V_{max}$ is the maximum absolute value of the electric potential. Then for b=0.8769σ the micro-object will move at maximum speed in the positive direction (i.e., $\dot{x}>0$) and for b=−0.8769σ will move the micro-object at maximum speed in the negative direction (i.e., $\dot{x}<0$), where a is the variance of the Gaussian random variable Y.

Figure 13:
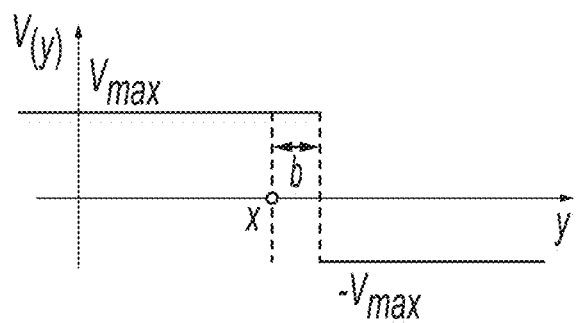
FIG. 13 is a diagram illustrating the bi-modal control policy in accordance with one embodiment, where x is the micro-object position, and the voltage polarity changes at x+b.

Proof. The graph of the function V(y), as defined by equation (4) can be seen with reference to FIG. 13. FIG. 13 is a diagram illustrating the bi-modal control policy in accordance with one embodiment, where x is the micro-object position, and the voltage polarity changes at x+b. The Gaussian distribution of Y enables to calculate the closed form expressions for $\bar{v}(x)$ and the potential energy. In particular:

$$\bar{v}(x) = \int_{-\infty}^{x+b} V_{max} f(y|x) dy - \int_{x+b}^{\infty} V_{max} f(y|x) dy$$

$$= V_{max} \Phi\left(\frac{b\sqrt{2}}{2\sigma}\right).$$

To evaluate the partial derivative of the potential energy, the energy function can be evaluated at points x and x+ε, followed by the computation of the $$\text{limit } \frac{\partial U(x)}{\partial x} = \lim_{\varepsilon \to 0} \frac{U(x+\varepsilon) - U(x)}{\varepsilon}.$$

Thus, $$U(x) = E[(V(Y) - \bar{v}(x))^2 | X = x] = -V_{max}^2 \Phi\left(\frac{b\sqrt{2}}{2\sigma}\right)^2 + V_{max}^2.$$

The perturbed mean voltage is given by:

$$\bar{v}(x+\varepsilon) = E[V(Y) | X = x+\varepsilon] = -V_{max} \Phi\left(\frac{(\varepsilon-b)\sqrt{2}}{2\sigma}\right).$$

which allows to compute the potential energy at x+ε, i.e., $$U(x+\varepsilon) = E[(V(Y) - \bar{v}(x+\varepsilon))^2 | X = x+\varepsilon]$$

$$= -V_{max}^2 \Phi\left(\frac{(\varepsilon-b)\sqrt{2}}{2\sigma}\right)^2 + V_{max}^2.$$

Finally, $$\frac{\partial U(x)}{\partial x} = \lim_{\varepsilon \to 0} \frac{U(x+\varepsilon) - U(x)}{\varepsilon} = \frac{4 V_{max}^2 \Phi\left(\frac{b\sqrt{2}}{2\sigma}\right) e^{-\frac{b^2}{2\sigma^2}}}{\sqrt{2\pi\sigma^2}}. \quad (5)$$

Expression (5) shows that $\tilde{V}(y)=-V(y)$ is a valid control policy resulting in the same energy function and induced force. Hence the maximum velocity is dictated by the maximum value of $$\Phi\left(\frac{b\sqrt{2}}{2\sigma}\right) e^{-\frac{b^2}{2\sigma^2}}.$$

Figure 14:
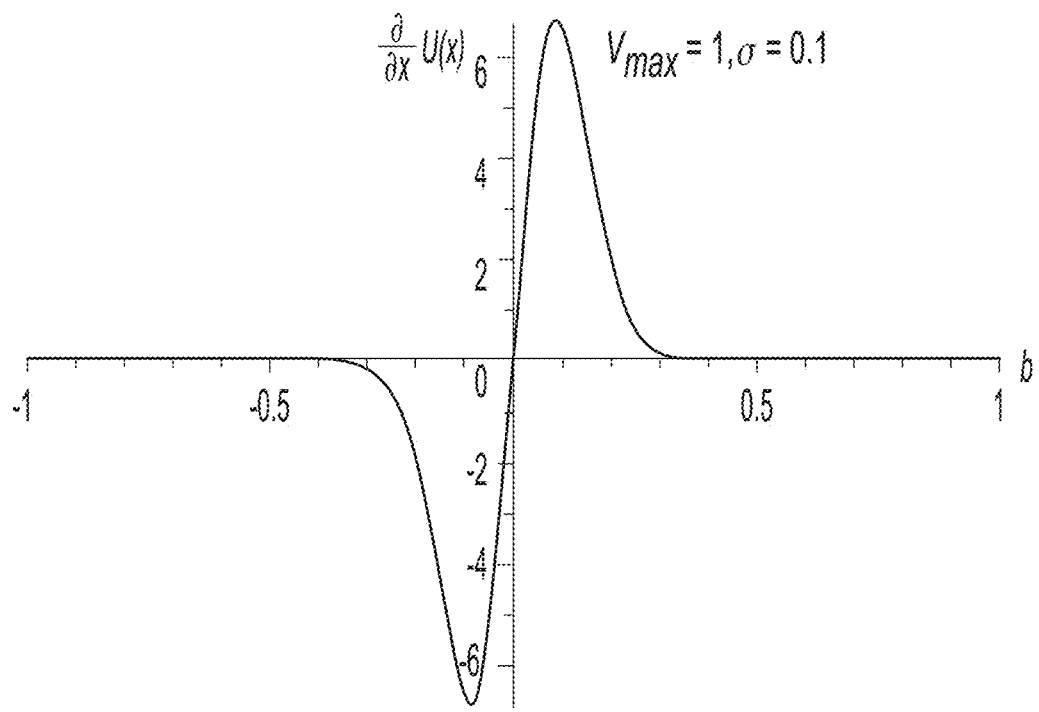
FIG. 14 is a diagram showing force distribution as a function of b for Vmax=1 and σ=0.1

The force dependence on b is depicted with reference to FIG. 14. FIG. 14 is a diagram showing force distribution as a function of b for $V_{max}=1$ and σ=0.1 The force derivative in terms of b as two critical points that are the solution of the equation $$-\sqrt{2}\pi\Phi\left(\frac{b}{\sigma\sqrt{2}}\right)b + 2\sigma\sqrt{\pi} e^{-\frac{b^2}{2\sigma^2}} = 0,$$

whose solution is evaluated numerically. In particular, a sequence of values is generated for sigma and the critical points corresponding to them are computed. Thus, the critical points having a linear dependence on a, namely b*=±0.8769σ were discovered.

The previous result shows that a bi-modal voltage distribution across the electrode 11 does indeed ensure that the micro-object moves in the desired direction. More importantly, and not unexpectedly, the result shows that only a limited number of electrodes are relevant, namely the electrodes whose positions are in the interval [−4σ, 4σ]. The control policy in the continuous representation of the electrodes is practically implemented by discretizing the control policy, resulting in $$V_i = \begin{cases} V_{max} & y \leq x+b \\ -V_{max} & y > x+b, \end{cases}$$

where $y_i$ is the position of electrode i and x is the micro-object position.

Control Policy

As described above, an experimentally designed control policy based on projecting an image containing particular patterns is used to push the micro-objects in a desired direction. The description that follows shows analytically why the control policy actually works, and formally re-discovers the pattern shapes. As in the previous section, the 1D case is considered and subsequently extended to the 2D case. Consider a control policy given by:

$$V(y) = \begin{cases} 0 & y \leq x+b \\ V_{max} & y > x+b \end{cases} \quad (6)$$

Figure 15:
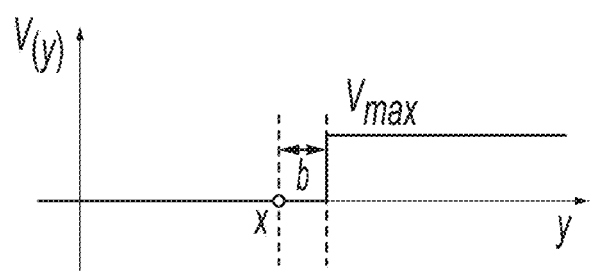
FIG. 15 is a diagram showing a bi-modal control policy in accordance with one embodiment, where x is the micro-object position, and the potential becomes non-zero starting at x+b.

The control policy is graphically depicted with reference to FIG. 15. FIG. 15 is a diagram showing a bi-modal control policy in accordance with one embodiment, where x is the micro-object position, and the potential becomes non-zero starting at x+b.

In the experimentally designed control policy, the voltage is not held constant for all points $y \geq x+b$, and for $y<x+b$ the electrode potential is free floating. An assumption is made here that the frequency at which the images are projected on the array is small enough so that the capacitors associated with electrode photo-diodes get completely discharged when they are not activated (i.e., black color projected on them). The following results summarizes the effect of this new policy on the micro-object motion.

Proposition 2. Let the function that describes the electric potential allocation be chosen as in (6), where $V_{max}$ is the maximum absolute value of the electric potential. Then for b=0.4307a the micro-object will move at maximum speed in the positive direction (i.e., $\dot{x}>0$) and for b=−0.4307σ it will move the micro-object at maximum speed in the negative direction (i.e., $\dot{x}<0$), where a is the variance of the Gaussian random variable Y.

Proof. The proof follows the same steps as in the proof of Proposition 1. The main difference is that now integration over the interval [x+b, ∞) only is performed. As before, the Gaussian distribution of Y allows to calculate closed form expressions for the potential energy. In particular, the potential energy at points U(x) and U(x+E) are given by $$U(x) = \frac{1}{8}\Phi\left(\frac{b}{\sigma\sqrt{2}}\right)V_{max}^2 - \frac{1}{8}\Phi\left(\frac{b}{\sigma\sqrt{2}}\right)^2 V_{max}^2 - \frac{1}{8}\Phi\left(\frac{b}{\sigma\sqrt{2}}\right)^3 V_{max}^2 + \frac{1}{8}V_{max}^2,$$

and $$U(x+\varepsilon) = -\frac{1}{8}\Phi\left(\frac{-b+\varepsilon}{\sigma\sqrt{2}}\right)V_{max}^2 - \frac{1}{8}\Phi\left(\frac{-b+\varepsilon}{\sigma\sqrt{2}}\right)^2 V_{max}^2 + \frac{1}{8}\Phi\left(\frac{-b+\varepsilon}{\sigma\sqrt{2}}\right)^3 V_{max}^2 + \frac{1}{8}V_{max}^2,$$

respectively. Taking £ to zero, we get the force expression:

$$F(x) = \frac{\partial U(x)}{\partial x}$$

$$= \frac{1}{4\sqrt{2\pi\sigma^2}} e^{-\frac{b^2}{2\sigma^2}} \left[3\Phi\left(\frac{b\sqrt{2}}{2\sigma}\right)^2 + 2\Phi\left(\frac{b\sqrt{2}}{2\sigma}\right) - 1\right].$$

Figure 16:
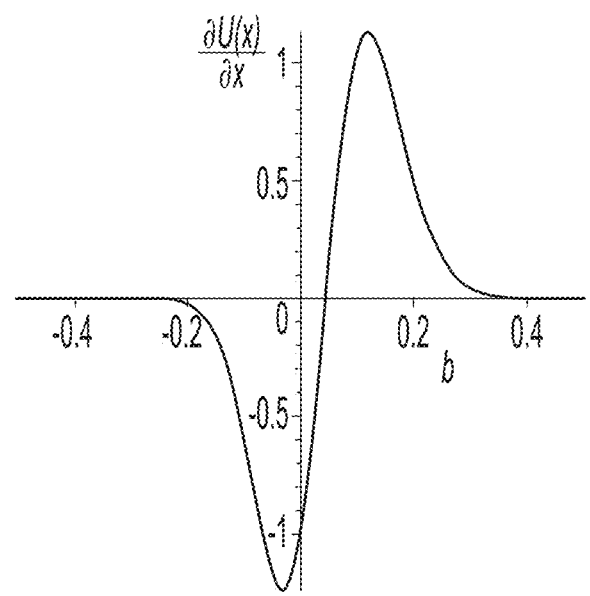
FIG. 16 is a diagram showing force distribution as a function of b for V_max=1 and σ=0.1 using the control policy of equation (6).

The force as a function of the variable b is shown with reference to FIG. 16. FIG. 16 is a diagram showing force distribution as a function of b for V_max=1 and σ=0.1 using the control policy of equation (6). FIG. 16 depicts as well two critical points that maximize velocity in the desired direction. There are two important differences, as compared to the policy introduced in equation (4). The critical points are given by b*=+0.43076, where the points were estimated numerically, and the magnitude of the force is significantly reduced (more than %80 reduction).

Note activating all electrodes does not make sense, but only the ones in the interval [x+b, 4σ], hence cutting the electrode activations after 4σ does not affect the generated force. The discretized control policy is given by $V_i=V_{max}$ for $y_i \in [x+b, 4\sigma]$, and unassigned otherwise, where $y_i$ is the position of electrode i, which is exactly the control scheme used experimentally. The experimentally designed control policy was implemented by considering some physical limitations of the actuation mechanism, which does not allow simultaneously setting positive and negative polarities for the electrode potentials.

Machine Learning Enabled Optimal Control Design

Above a formal proof that a bi-modal control policy is sufficient to induce a micro-object motion in a desired direction was provided. An interesting question is if such a policy is optimal. Although the description below does not analytically prove optimality, leveraging the deep-learning optimization framework (as described Dougal Maclaurin, David Duvenaud, and Ryan P Adams. Autograd: Effortless gradients in numpy. In *ICML* 2015 *AutoML Workshop,* 2015; and Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017, the disclosures of which are incorporated by reference) to solve a regression problem whose result is the array's electric potential distribution is provided. As seen in what follows, the optimization results strengthen the conjecture that the control policy derived through equation (4) is indeed optimal.

The function that determines the allocation of the potential was modeled as a neural network (NN) with two hidden layers of size 60 and tanh as activation function, that is V (y)=V (y; β), where β is the vector of parameters encompassing the weights and the biases of the NN. The following optimization problem was formulated, previously provided in equation (1).

$$\max_{\beta} \frac{\partial U}{\partial x}(x) \quad (1)$$

$$\text{s.t.}: U(x; \beta) = E[(V(Y; \beta) - \overline{v}(X; \beta))^2 \mid X = x]$$

$$\overline{v}(X; \beta) = E[V(Y;\beta) \mid X]$$

The optimal solution of (1) maximizes the micro-object solution in the positive direction. For the negative direction, the sign of the cost function describing the partial derivative of the potential energy U can be changed. Note that unlike the case when policy of equation (4) is used, the conditional expectations can no longer be analytically evaluated. The address this challenge, Gauss quadrature rules are used, which, as mentioned above, are often found in the theory of generalized chaos polynomials as described by Anthony O'Hagan. Polynomial chaos: A tutorial and critique from a statistician's perspective. Technical report, University of Sheffield, UK, May 2013; Ralph C. Smith. *Uncertainty*

*Quantification: Theory, Implementation, and Applications*. Society for Industrial and Applied Mathematics, Philadelphia, Pa., USA, 2013; Norbert Wiener. The Homogeneous Chaos. *American Journal of Mathematics*, 60(4):897-936, 1938; Dongbin Xiu, Didier Lucor, C.-H. Su, and George Em Karniadakis. Performance evaluation of generalized polynomial chaos. In *Computational Science—ICCS 2003: International Conference, Melbourne, Australia and St. Petersburg, Russia*, Jun. 2-4, 2003 Proceedings, Part IV, pages 346-354, Berlin, Heidelberg, 2003. Springer Berlin Heidelberg, the disclosures of which are incorporated by reference. Gauss quadrature rules provide the tool to efficiently evaluate the conditional expectations. Thus, the expectation of a function of a random variable with a Gaussian distribution, can be accurately approximated using Gauss-Hermite quadrature. Accordingly, the expectation of $V(Y; \beta)$ is given by $$\bar{v}(x;\beta) = E[V(Y;\beta) \mid X = x] \approx \frac{1}{\sqrt{\pi}} \sum_{i=1}^{n} w_i f V(\sqrt{2}\,\sigma y_i + x; \beta),$$

where n is the number of sample points, $y_i$ are the roots of the physicists' version of the Hermite polynomial $H_n(y)$ and $w_i$ are associated weights given by $$w_i = \frac{2^{n-1} n! \sqrt{\pi}}{n^2 [H_{n-1}(y_i)]^2}.$$

Similarly, the variance of $V(Y; \beta)$ can be approximated as $$U(x;\beta) = E[(V(Y;\beta) - \bar{v}(X;\beta))^2 \mid X = x] \approx$$
$$\frac{1}{\sqrt{\pi}} \Sigma_{i=1}^{n} w_i \left[ V(\sqrt{2}\,\sigma y_i + x; \beta) - \bar{v}(x;\beta) \right]^2.$$

Hence, the optimization problem (1) becomes as previously given in equation (2):

$$\max_{\beta} \frac{\partial \hat{U}}{\partial x}(x) \quad (2)$$
$$\text{s.t.: } \hat{U}(x;\beta) = \frac{1}{\sqrt{\pi}} \Sigma_{i=1}^{n} w_i \left[ V(\sqrt{2}\,\sigma y_i + x; \beta) - \hat{v}(x;\beta) \right]^2$$
$$\hat{v}(X;\beta) = \frac{1}{\sqrt{\pi}} \Sigma_{i=1}^{n} w_i V(\sqrt{2}\,\sigma y_i + x; \beta)$$

Automatic differentiation feature of Autograd Module of PyTorch® software developed by Facebook, Inc. of Menlo Park, Calif. (and described by Maclaurin et al., "Autograd: Effortless gradients in numpy," *ICML* 2015 *AutoML Workshop*, 2015) was used to evaluate the cost function which requires the computation of the partial derivative of $U(x)$ as a function of the NN weights and biases. To solve equation 2, Adam gradient based optimization algorithm was run for 1500 iteration with a stepsize $\alpha=0.001$. The optimization problem was solved for $x=0$, and a sequence of the number of sample points $n \in \{10, 20, 30, 40, 50\}$. They all resulted in the same type of control policy, as shown with reference to FIG. 9 for $n=30$. We recover the bi-modal control policy introduced in equation (4) that shows the sudden change in polarite just in front of the micro-object. Due to the translational symmetry of the micro-object dynamics, solve the optimization problem for $x=0$ only is sufficient.

Extension to 2D Control Policy

In this section is demonstrated how the previous results can be extended to the 2D case. Denoted by $x=(x_1, x_2)$ is the micro-object position and by $y^{(i)}=(y_1^{(i)}, y_2^{(i)})$ the position of electrode i. The micro-object dynamics becomes $$\mu \dot{x} = \nabla U(x),$$

where $\mu$ is the viscous coefficient, and $U(x)$ denotes the micro-object's potential energy. As is the 1D case, the potential energy is given by $$U(x) = \tfrac{1}{2} \Sigma_{i=1}^{N} C_i(x) [V_i - V(x)]^2,$$

where $V(x)$ denotes the micro-object electric potential, $C_i(x) = C(\|x - y^{(i)}\|)$ represents the capacitance between the micro-object and electrode i a position $y^{(i)}$, and $V_i$ represents the potential of electrode i. Similar to the 1D case, an assumption that the capacitance $C_i$ can be represented as the un-normalized discretization of a multivariable Gaussian pdf, that is:

$$C_i(x) \sim \int_{y_1^{(i)} - \delta/2}^{y_1^{(i)} + \delta/2} \int_{y_2^{(i)} - \delta/2}^{y_2^{(i)} + \delta/2} f(y \mid x) dy,$$

where $Y \sim \mathcal{N}(X, \sigma^2 I)$. The control objective is to determine a distribution for the electrode potential that moves the micro-object towards a position $x^{(d)}$. A scenario shown with reference to FIG. 10, where the motion is parallel to the $y_i$ axis. This is sufficient since the potential distribution for other scenarios are derived by performing a rotational transformation as the micro-object dynamics is endowed with translational and rotational symmetries.

We use the following bi-modal control policy:

$$V(y) = V(y_1, y_2) = \begin{cases} V_{max} & y_1 \leq x_1 + b, \forall y_2 \\ -V_{max} & y_1 > x_1 + b, \forall y_2 \end{cases} \quad (7)$$

The micro-object potential is computed as the mean of the potential function $V(y)$, that is $$\bar{v}(x) = E[V(Y) \mid X = x] = V_{max} \Phi\left(\frac{b\sqrt{2}}{2\sigma}\right).$$

The potential energy can be computed in closed form, and is given by $$U(x) = E[(V(Y) - \bar{v}(x))^2 \mid X = x]$$
$$= -V_{max}^2 \Phi\left(\frac{b\sqrt{2}}{2\sigma}\right)^2 + V_{max}^2$$

To evaluate the gradient of the potential energy, the partial derivatives of $U(x)$ are computed. Thus, $$U(x_1 + \varepsilon, x_2) = E[(V(Y) - \bar{v}(x_1 + \varepsilon, x_2))^2 \mid X = (x_1 + \varepsilon, x_2)]$$
$$= -V_{max}^2 \Phi\left(\frac{(\varepsilon - b)\sqrt{2}}{2\sigma}\right)^2 + V_{max}^2,$$

-continued where $$\bar{V}(x_1 + \varepsilon, x_2) = E[V(Y) \mid X = (x_1 + \varepsilon, x_2)]$$
$$= -V_{max} \Phi\left(\frac{(\varepsilon - b)\sqrt{2}}{2\sigma}\right).$$

Accordingly, $$\frac{\partial U}{\partial x_1}(x_1, x_2) = \lim_{\delta \to 0} \frac{U(x_1 + \varepsilon, x_2) - U(x_1, x_2)}{\varepsilon}$$

$$= \frac{4V_{max}^2 \Phi\left(\frac{b\sqrt{2}}{2\sigma}\right) e^{-\frac{b^2}{2\sigma^2}}}{\sqrt{2\pi\sigma^2}}$$

Similarly, the partial derivatives of $U(x_1, x_2)$ are computed with respect to $x_2$, which turns out to be zero, that is $$\frac{\partial U}{\partial x_2}(x_1, x_2) = 0.$$

Note that the control policy generates a force on the $y_1$ axis only, and the control policy has the exact expression as the force generated in the 1D case. All results determined for the 1D case concerning the choice of b to generate the maximum force hold for the 2D case, as well. Note that discretization of the ideal control policy will introduce some errors since the micro-object may not be exactly on top of an electrode. That is why, the experimental policy is based on a pattern that includes neighboring electrodes for cases when electrodes are not exactly aligned with the direction towards the desired position.

The general 2D control policy can be summarized in the following result.

Proposition 3 Let $x^{(0)}$ be the current micro-object position and let $x^{(d)}$ be the desired micro-object position. Then the control policy $$V(y) = V(y_1, y_2) = \begin{cases} V_{max} & y_2 \le x_2^{(b)} + \frac{1}{s}(y_1 - x_1^{(b)}) \\ -V_{max} & y_2 > x_2^{(b)} + \frac{1}{s}(y_1 - x_1^{(b)}), \end{cases} \quad (9)$$

where $$x^{(b)} = x^{(0)} + b \frac{x^{(d)} - x^{(0)}}{\|x^{(d)} - x^{(0)}\|} \text{ and}$$

$$s = \frac{x_2^{(d)} - x_2^{(0)}}{x_1^{(d)} - x_1^{(0)}}$$

ensure micro-object motion towards the desired position $x^{(d)}$ for positive b and away from $x^{(d)}$ for negative b.

Proof. The proof follows by applying a rotational transformation so that $\hat{x}^{(0)} = R(\theta)x^{(0)}$ and $\hat{x}^{(d)} = R(\theta)x^{(d)}$ are such that $\hat{x}_2^{(0)} = \hat{x}_2^{(d)} = 0$ and applying the policy (11). We also note that $$y_2 = x_2^{(b)} + \frac{1}{s}(y_1 - x_1^{(b)})$$

is orthogonal on the line that connects $x^{(0)}$ and $x^{(d)}$ and passes through a point $x^{(b)}$ at a distance b from $x^{(0)}$, on the same line.

While the invention has been particularly shown and described as referenced to the embodiments thereof, those skilled in the art will understand that the foregoing and other changes in form and detail may be made therein without departing from the spirit and scope of the invention.

What is claimed is:

1. A system for machine-learning enabled micro-assembly control with an aid of a digital computer, comprising:
   one or more processors implementing one or more machine learning algorithms, the one or more processors configured to:
   obtain one or more parameters of a system for positioning a micro-object, the system comprising a plurality of electrodes, each of the electrodes being programmable, the electrodes configured to induce a movement of the micro-object when the micro-object is proximate to the electrodes upon a generation of one or more electric potentials by one or more of the electrodes;
   model capacitance between the micro-object and the electrodes using the parameters;
   estimate a position of the micro-object with a sensor;
   receive further position of the micro-object;
   define using the capacitance a continuous representation of a dynamic model for movement of the micro-object due to electrode potentials generated by at least one of the plurality of the electrodes, wherein the dynamic model is associated with constraints expressed as expectations;
   apply one of the machine learning algorithms to at least a portion of the continuous representation of the dynamic model to perform an optimization of electrode potentials to be generated by at least one of the plurality of the electrodes to move the micro-object from the estimated position to the further position; and
   use the optimized electrode potentials to actuate at least one of the plurality of the electrodes to induce the movement of the micro-object from the estimated position to the further position.

2. A system according to claim 1, wherein one of the constraints comprises a potential energy of the micro-object and the potential energy is approximated during the optimization using Gauss quadrature rules.

3. A system according to claim 2, the one or more processors further configured to:
   represent a function that determines an allocation of the optimized electrode potentials as a neural network associated with weights and biases.

4. A system according to claim 3, wherein the one machine learning algorithm is automatic differentiation, the one or more processors further configured to:
   use the automatic differentiation to compute partial derivatives of the potential energy as a function of the weights and biases associated with the neural network.

5. A system according to claim 3, wherein the neural network comprises two hidden layer and uses tanh as an activation function.

6. A system according to claim 1, wherein the further position is separated by a distance in a direction from the estimated position, the one or more processors further configured to:
   receive an additional position that is separated by the distance from the estimated position in a direction opposite to the direction in which the further position is separated from the estimated position; and change a sign of the function to optimize the potentials for moving the micro-object from the estimated position to the additional position.

7. A system according to claim 1, wherein the movement from the estimated position to the further position is in one dimension, the one or more processors further configured to:
receive an additional position that is separated from the estimated position in two dimensions; and
apply a rotational transformation to the optimized electrode potentials to derive the electrode potentials to be generated by the electrodes for moving the micro-object from the estimated position to the additional position.

8. A system according to claim 1, the one or more processors further configured to:
perform a plurality of simulations of the capacitance between the electrodes and the micro-object; and
define a function describing the capacitance between the micro-object and each of the electrodes as a function of a distance between the micro-object and that electrode.

9. A system accordingto claim 1, one or more of the processors comprise one or more of at least one central processingunit (CPU) and at least one graphics processing unit (GPU).

10. A system according to claim 1, wherein at least one of the plurality of the electrodes is rectangular.

11. A method for machine-learning enabled micro-assembly control with an aid of a digital computer, comprising:
obtaining, by one or more processors implementing one or more machine learning algorithms, one or more parameters of a system for positioning a micro-object, the system comprising a plurality of programmable electrodes, the electrodes configured to induce a movement of the micro-objects when the micro-objects are proximate to the electrodes upon a generation of one or more electric potentials by one or more of the electrodes;
modeling by one or more of the processors capacitance between the micro-object and the electrodes using the parameters;
estimating by one or more of the processors a position of the micro-object based on at least one sensor measurement;
receive by one or more of the processors further position of the micro-object;
define by one or more of the processors using the capacitance a continuous representation of a dynamic model for movement of the micro-object due to electrode potentials generated by at least one of the plurality of the programmable electrodes, wherein the dynamic model is associated with constraints expressed as expectations;
apply by one or more of the processors one of the machine learning algorithms to at least a portion of the continuous representation of the dynamic model to perform an optimization of electrode potentials to be generated by at least one of the plurality of the programmable electrodes to move the micro-object from the estimated position to the further position; and
using the optimized electrode potentials to actuate at least one of the plurality of the programmable electrodes to induce the movement of the micro-object from the estimated position to the further position.

12. A method according to claim 11, wherein one of the constraints comprises a potential energy of the micro-object and the potential energy is approximated during the optimization using Gauss quadrature rules.

13. A method according to claim 12, further comprising:
representing a function that determines an allocation of the optimized electrode potentials as a neural network associated with weights and biases.

14. A method according to claim 13, wherein the one machine learning algorithm is automatic differentiation, further comprising:
using the automatic differentiation to compute partial derivatives of the potential energy as a function of the weights and biases associated with the neural network.

15. A method according to claim 13, wherein the neural network comprises two hidden layers and uses tanh as an activation function.

16. A method according to claim 11, wherein the further position is separated by a distance in a direction from the estimated position, further comprising:
receiving an additional position that is separated by the distance from the estimated position in a direction opposite to the direction in which the further position is separated from the estimated position; and
changing a sign of the function to optimize the potentials for moving the micro-object from the micro-object from the estimated position to the additional position.

17. A method according to claim 11, wherein the movement from the estimated position to the further position is in one dimension, the one or more processors further configured to:
receiving an additional position that is separated from the estimated position in two dimensions; and
applying a rotational transformation to the optimized electrode potentials to derive the electrode potentials to be generated by the electrodes for moving the micro-object from the estimated position to the additional position.

18. A method according to claim 11, further comprising:
performing a plurality of simulations of the capacitance between the electrodes and the micro-object; and
defining a function describing the capacitance between the micro-object and each of the electrodes as a function of a distance between the micro-object and that electrode.

19. A method according to claim 11, one or more of the processors comprise one or more of at least one central processingunit (CPU) and at least one graphical processing unit (GPU).

20. A method according to claim 11, wherein at least one of the plurality of programmable electrodes is rectangular.

* * * * *